United States Patent
Liu et al.

(10) Patent No.: US 12,363,557 B2
(45) Date of Patent: **\*Jul. 15, 2025**

(54) APPARATUSES AND METHODS FOR BASE STATIONS WITH UPTILT ANTENNAS FOR AERIAL VEHICLES

(71) Applicant: QUALCOMM Incorporated, San Diego, CA (US)

(72) Inventors: Le Liu, San Jose, CA (US); Alberto Rico Alvarino, San Diego, CA (US); Peter Gaal, San Diego, CA (US); Chiranjib Saha, Lakeside, CA (US); Umesh Phuyal, San Diego, CA (US); Xiao Feng Wang, San Diego, CA (US); Juan Montojo, San Diego, CA (US); Vishnu Vardhan Chetlur Ravi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,926

(22) Filed: Feb. 12, 2024

(65) Prior Publication Data

US 2024/0187874 A1    Jun. 6, 2024

Related U.S. Application Data

(63) Continuation of application No. 17/193,897, filed on Mar. 5, 2021, now Pat. No. 11,902,800.

(51) Int. Cl.
*H04W 16/28*  (2009.01)
*H04B 7/06*  (2006.01)
(Continued)

(52) U.S. Cl.
CPC .......... *H04W 16/28* (2013.01); *H04B 7/0626* (2013.01); *H04L 5/0051* (2013.01);
(Continued)

(58) Field of Classification Search
CPC ... H04W 16/28; H04W 36/08; H04W 56/001; H04W 74/0833; H04W 84/06;
(Continued)

(56) References Cited

U.S. PATENT DOCUMENTS

| 11,902,800 B2 | 2/2024 | Liu et al. |
| 2020/0245175 A1 | 7/2020 | Zhang et al. |

(Continued)

OTHER PUBLICATIONS

Chen Y., et al., "5G Air-to-Ground Network Design and Optimization: A Deep Learning Approach", arxiv.org, Cornell University Library, 201 Olin Library Cornell University, Ithaca, NY, 14853, Nov. 17, 2020, 6 Pages.

(Continued)

*Primary Examiner* — Eric Myers
(74) *Attorney, Agent, or Firm* — Paul M. McAdams; Shumaker & Sieffert, PA

(57) ABSTRACT

Example aspects include a method, apparatus and computer-readable medium of wireless communication at a base station of a mobile network, comprising transmitting system information corresponding to an aerial cell of the mobile network or a cell having at least one aerial sector being formed by one or more uptilt beams of the base station. The aspects further include performing, according to the system information, a random access channel (RACH) procedure with an aerial user equipment (UE). Additionally, the aspects include establishing, via the aerial cell or the at least one aerial sector, a communications link with the aerial UE.

28 Claims, 9 Drawing Sheets

(51) Int. Cl.
  *H04L 5/00* (2006.01)
  *H04W 36/08* (2009.01)
  *H04W 56/00* (2009.01)
  *H04W 74/0833* (2024.01)
  *H04W 84/06* (2009.01)

(52) U.S. Cl.
  CPC ....... *H04W 36/083* (2023.05); *H04W 56/001* (2013.01); *H04W 74/0833* (2013.01); *H04W 84/06* (2013.01)

(58) Field of Classification Search
  CPC ............... H04W 84/005; H04B 7/0626; H04B 7/18506; H04L 5/0051
  See application file for complete search history.

(56) References Cited

U.S. PATENT DOCUMENTS

2022/0210844 A1  6/2022  Molavianjazi et al.
2022/0417759 A1  12/2022  Poscher et al.

OTHER PUBLICATIONS

International Search Report and Written Opinion—PCT/US2022/070982—ISA/EPO—Jun. 13, 2022.
Singh S., et al., "Spectrum Reuse among Aerial and Ground Users in mmWave Cellular Networks in Urban Settings", 2020 IEEE 17th Annual Consumer Communications & Networking Conference (CCNC), IEEE, Jan. 10, 2020, pp. 1-6.

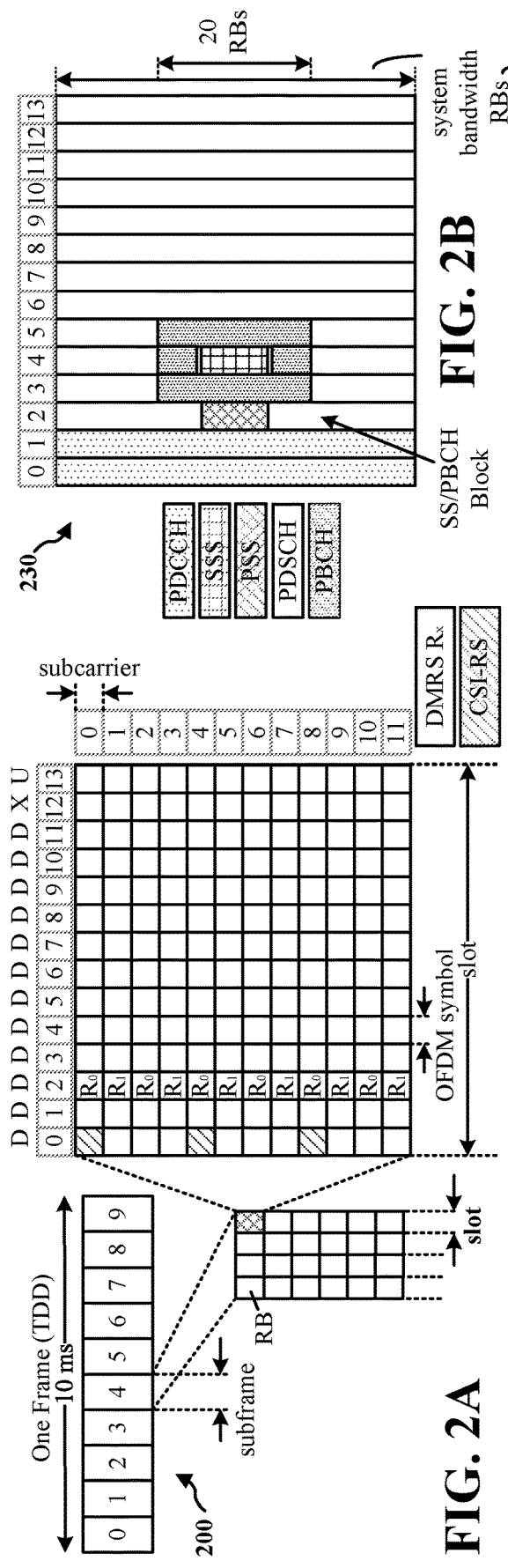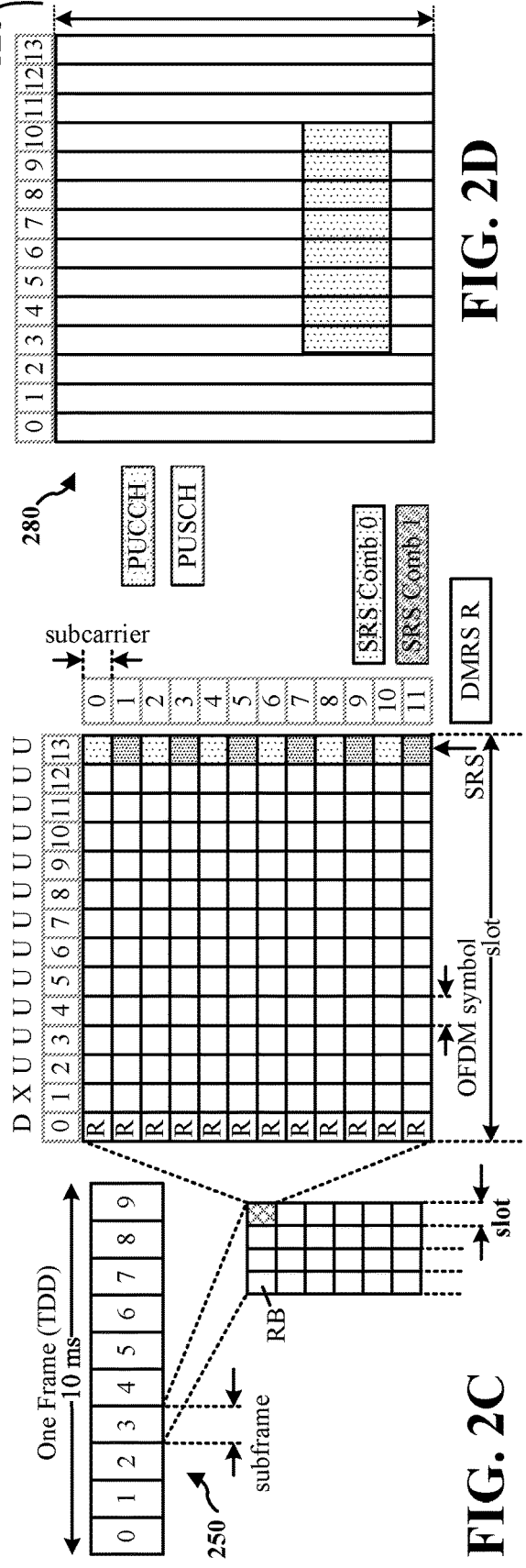

APPARATUSES AND METHODS FOR BASE STATIONS WITH UPTILT ANTENNAS FOR AERIAL VEHICLES

This application is a continuation of U.S. application Ser. No. 17/193,897, filed Mar. 5, 2021, the entire contents of which are hereby incorporated by reference.

BACKGROUND

Technical Field

The described aspects relate generally to wireless communication systems, and more particularly, to apparatuses and methods for providing base stations with uptilt antennas for establishing communications with aerial vehicles.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise communication between components of the wireless network and unmanned aerial vehicles (UAVs), such as drones.

The use of aerial vehicles (e.g., UAVs, drones, unmanned aircraft systems (UASs)) is expanding. However, conventional wireless communication systems may not be appropriately configured to support deployment of aerial vehicles. For example, the coverage area of such wireless communication systems may be optimized for terrestrial (e.g., conventional) user equipment (UE) that may typically be located at heights below aerial vehicles. As such, the aerial vehicles may not be able to establish and/or maintain communications links with the wireless communication systems when flying at heights above the coverage area of the wireless communication system. There exists a need for further improvements in 5G NR technology. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication to be performed by a base station of a mobile network, comprising transmitting system information corresponding to an aerial cell of the mobile network or a cell having at least one aerial sector being formed by one or more uptilt beams of the base station. The method further includes performing, according to the system information, a RACH procedure with an aerial UE. Additionally, the method includes establishing, via the aerial cell or the at least one aerial sector, a communications link with the aerial UE.

Another example aspect includes an apparatus of wireless communication at a base station of a mobile network, comprising a non-transitory memory storing computer-executable instructions, and a processor communicatively coupled with the non-transitory memory. The processor is configured to execute the instructions to transmit system information corresponding to an aerial cell of the mobile network or a cell having at least one aerial sector being formed by one or more uptilt beams of the base station. The processor is further configured to execute further instructions to perform, according to the system information, a RACH procedure with an aerial UE. Additionally, the processor is further configured to execute further instructions to establish, via the aerial cell or the at least one aerial sector, a communications link with the aerial UE.

Another example aspect includes a method of wireless communication to be performed by an aerial user equipment (UE) in a mobile network, comprising receiving, from the mobile network, system information corresponding to an aerial cell of the mobile network or a cell having at least one aerial sector being formed by one or more uptilt beams of a base station of the mobile network. The method further includes performing, according to the system information, a random access channel (RACH) procedure with the mobile network. Additionally, the method includes establishing, via the aerial cell or the at least one aerial sector, a communications link with the mobile network.

Another example aspect includes an apparatus of wireless communication at an aerial UE in a mobile network, comprising a non-transitory memory storing computer-executable instructions, and a processor communicatively coupled with the non-transitory memory. The processor is configured to execute the instructions to receive, from the mobile network, system information corresponding to an aerial cell of the mobile network or a cell having at least one aerial sector being formed by one or more uptilt beams of a base station of the mobile network. The processor is further configured to execute further instructions to perform, according to the system information, a RACH procedure with the mobile network. Additionally, the processor is further configured to execute further instructions to establish, via the aerial cell or the at least one aerial sector, a communications link with the mobile network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
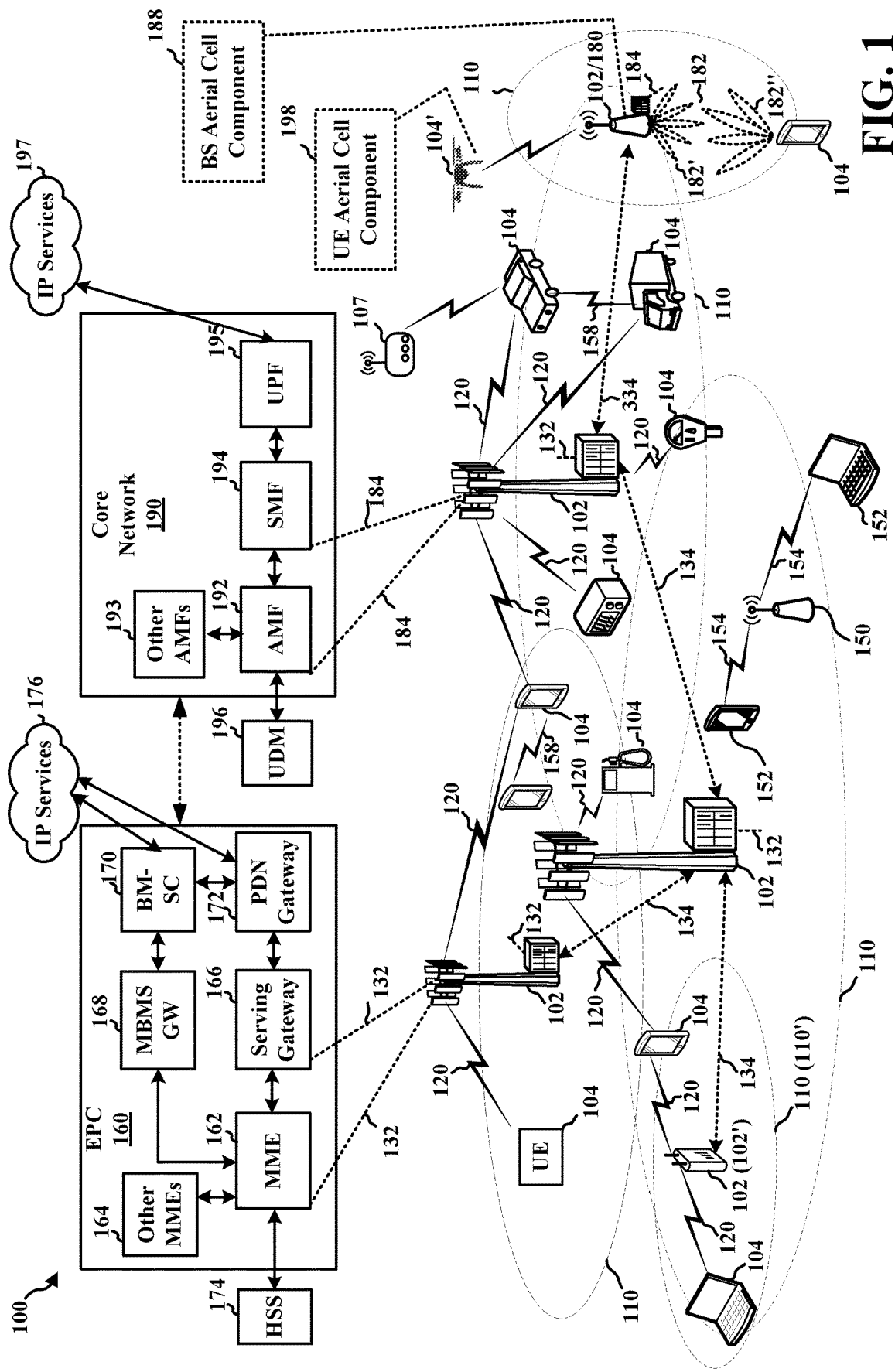
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station (e.g., a network-side device) in a wireless communication system may deploy one or more cells and/or sectors to provide a coverage area within which a user equipment (UE) may establish a communications link with the wireless network. The base station may form the cells and/or sectors using downtilted beams. That is, the downtilted beams may have a corresponding tilt angle such that the resulting cell and/or sector generally points towards the ground. Such cells may be referred to as terrestrial cells. The shape and size of the coverage area of the terrestrial cells may be affected by interference, multipath, and/or blockages (e.g., coverage dead spots) created by artificial structures (e.g., high-rise building, bridge, etc.) and/or natural features of the terrain (e.g., mountain, change in elevation). However, moving the terrestrial cells upwards (i.e., decreasing their tilt angle), to decrease such effects, may increase inter-cell interference (e.g., interference from neighboring cells). That is, the network device may be configured to optimize the coverage area below the antenna(s) of the network device. While such a configuration may benefit conventional (or terrestrial) UEs, the configuration may not be appropriate for an aerial UE (e.g., unmanned aerial vehicle (UAV), drone, unmanned aircraft system (UAS)) in flight. That is, the aerial UE may be flying above the optimized coverage area of the network device, and, as such, may not be able to establish and/or maintain a communications link with the wireless network.

For example, the network device may transmit system information and configuration parameters for establishing communications links to the wireless network that may not be appropriate for the aerial UE, and, as such, may prevent the aerial UE from establishing a communications link. For another example, the aerial UE may receive a stronger cell signal from another network device that is more geographically distant to the aerial UE than the nearest network device, resulting in the aerial UE expending additional power to establish a communications link with the geographically distant network device when compared to connecting to the nearest network device.

Aspects presented herein provide for multiple manners for a base station to deploy and configure aerial cells and/or aerial sectors dedicated for communications links with aerial UEs. The aspects presented herein are directed to a base station performing the techniques, however, the techniques are not limited to a base station and may be performed by other network elements (e.g., network-side devices). In some aspects, the aerial cells and/or aerial sectors may be formed using uptilted beams. That is, the uptilted beams may have a corresponding tilt angle such that the resulting cell and/or sector generally points away from the ground (e.g., towards the sky). In other aspects, the network device may transmit system information and configuration parameters dedicated to the aerial cells that the aerial UEs may use to establish and maintain communications links using the aerial cells and/or aerial sectors. Further, aspects presented herein may reduce power consumption and increase efficiency of the wireless communication system when compared to a conventional wireless communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. The computer-readable medium (also referred to as computer-readable media) includes a computer storage medium which may be referred to as non-transitory computer-readable medium. A non-transitory computer-readable medium may exclude transitory signals. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In certain aspects, the UEs 104 may comprise aerial UEs 104', such as UAVs, drones, and UASs. That is, the aerial UEs 104' may differ from terrestrial UEs 104 (e.g., conventional UEs such as a smartphone, computer, and the like) in that aerial UEs 104' comprises flight capabilities. The aerial UEs 104' may or may not comprise autonomous flight capabilities. The aerial UEs 104' may include a UE aerial cell component 198 configured to establish communications links to the base stations 102 via aerial cells and/or aerial sectors. For example, the UE aerial cell component 198 may be configured to receive system information corresponding to the aerial cells and/or aerial sectors, perform random access channel (RACH) procedures according to the system information, and to establish communications link between the base stations 102 and the aerial UEs 104' via the aerial cells and/or aerial sectors. Similarly, the base stations 102 may include a base station (BS) aerial cell component 188 configured to provide aerial cells and/or aerial sectors for wireless communications between the base stations 102 and the aerial UEs 104'. The BS aerial cell component 188 may be configured to transmit system information corresponding to the aerial cells and/or aerial sectors, perform RACH procedures according to the system information, and to establish communications links between the base stations 102 and the aerial UEs 104' via the aerial cells and/or aerial sectors.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with all uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include minislots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2\mu$ slots/subframe. The subcarrier spacing and symbol length/duration are a function of the numerology. The subcarrier spacing may be equal to $2\mu*15$ kHz, where p is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
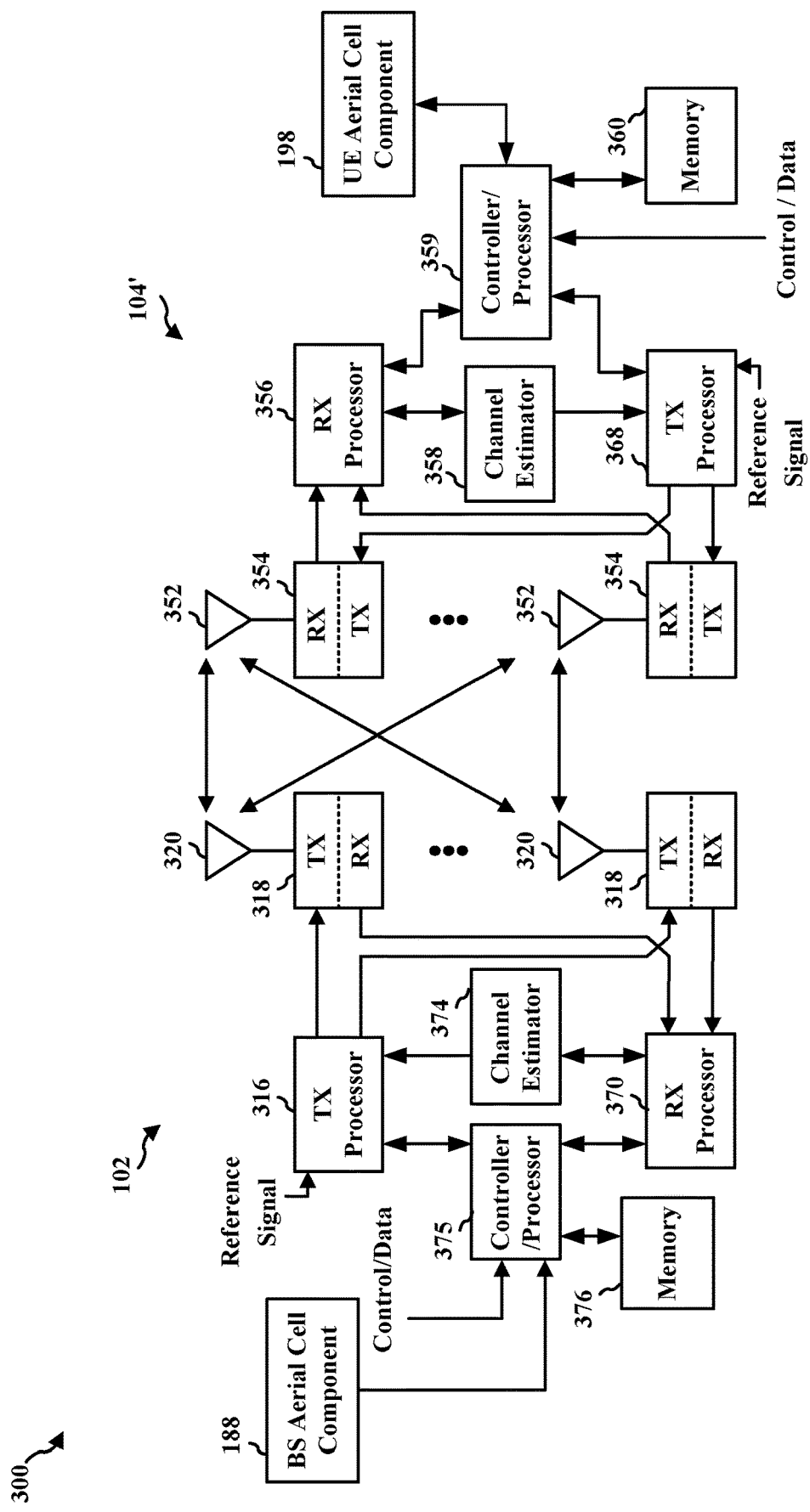
FIG. 3 is a diagram illustrating an example of hardware components of a base station and an aerial UE in an access network, in accordance with various aspects of the present disclosure.

FIG. 3 is a block diagram 300 of example hardware components of a base station 102 in communication with an aerial UE 104' in an access network. In the downlink, IP packets from the EPC 160 may be provided to a controller/processor 375. The controller/processor 375 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the aerial UE 104'. Each spatial stream may then be provided to a different antenna 320 via a separate transmitter 318TX. Each transmitter 318TX may modulate an RF carrier with a respective spatial stream for transmission.

At the base station 102, at least one of the TX processor 316, the RX processor 370, and the controller/processor 375 may be configured to perform aspects in connection with the BS aerial cell component 188 of FIG. 1.

At the aerial UE 104', each receiver 354RX may receive a signal through its respective antenna 352. Each receiver 354RX may recover information modulated onto an RF carrier and may provide the information to the receive (RX) processor 356. The TX processor 368 and the RX processor 356 may implement Layer 1 functionality associated with various signal processing functions. The RX processor 356 may perform spatial processing on the information to recover any spatial streams destined for the aerial UE 104'. If or when multiple spatial streams are destined for the aerial UE 104', the multiple spatial streams may be combined by the RX processor 356 into a single OFDM symbol stream. The RX processor 356 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 358. The soft decisions may then be decoded and deinterleaved to recover the data and control signals that were originally transmitted by base station 102 on the physical channel. The data and control signals may then be provided to the controller/processor 359, which may implement Layer 3 and Layer 2 functionality.

The controller/processor 359 can be associated with a memory 360 that stores program codes and data. The memory 360 may be referred to as a non-transitory computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by base station 102, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission may be processed at the base station 102 in a manner similar to that described in connection with the receiver function at the aerial UE 104'. Each receiver 318RX may receive a signal through its respective antenna 320. Each receiver 318RX may recover information modulated onto an RF carrier and may provide the information to a RX processor 370.

The controller/processor 375 may be associated with a memory 376 that stores program codes and data. The memory 376 may be referred to as a non-transitory computer-readable medium. The controller/processor 375 may provide demultiplexing between transport and logical channels, packet reassembly, deciphering, header decompression, control signal processing. The controller/processor 375 may also be responsible for error detection using an ACK and/or NACK protocol to support HARQ operations.

At the aerial UE 104', at least one of the TX processor 368, the RX processor 356, and the controller/processor 359 may be configured to perform aspects in connection with the UE aerial cell component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
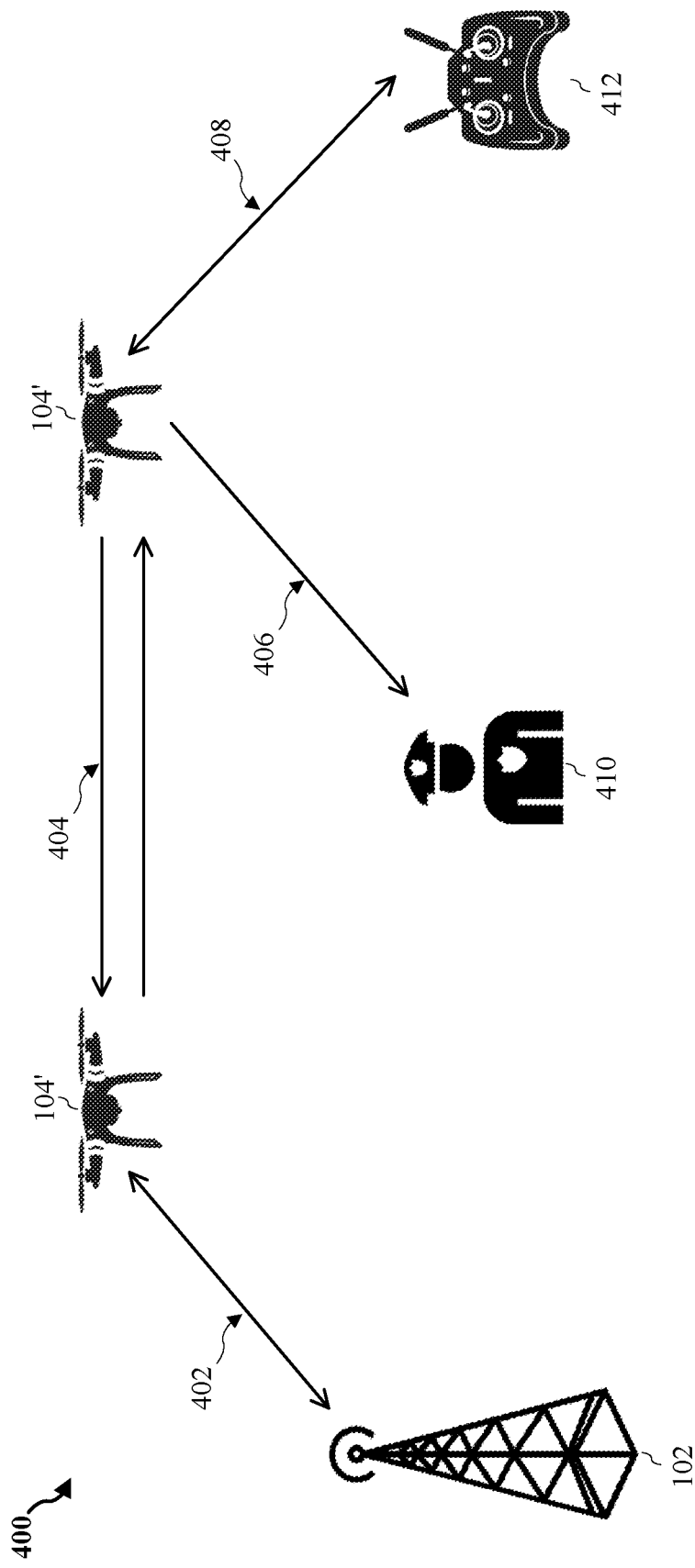
FIG. 4 is a diagram illustrating an example of an unmanned aircraft system (UAS) for facilitating communications between aerial UEs, in accordance with various aspects of the present disclosure.

FIG. 4 illustrates an example of an unmanned aircraft system (UAS) 400 for facilitating communications between multiple aerial UEs 104' and one or more aerial network components. For example, the UAS 400 may include an unmanned aerial vehicle (UAV) controller (UAVc) 412, a security entity 410, a base station 102 (e.g., gNB), and aerial UEs 104'. The aerial UEs 104' may comprise an UAV or a drone. The aspects presented herein are not limited in this regard, and may be used with other types of aerial UEs. Notably, the aspects presented herein may be employed with any UE that comprises flight capabilities.

In some aspects, the UAVc 412 may control one or more of the aerial UEs 104' via a UAV-to-everything (U2X) interface 408. For example, the UAVc 412 may communicate with the aerial UE 104' over a U2X C2 interface. In another example, the UAVc 412 may communicate with the aerial UE 104' over a U2X PC5 interface. That is, the UAVc 412 and the aerial UE 104' may exchange command and control information over the U2X interface 408. The command and control information may include, but not be limited to, flight control commands, sensor control commands, as well as, position, trajectory data (e.g., height, velocity, heading, yaw angle), status information (e.g., power reserve level, motor rotation speed), and identification information (e.g., serial number, civil aviation agency assigned identifier, operator identifier).

In other aspects, the aerial UE 104' may communicate with another aerial UEs 104' over a direct device-to-device (D2D) interface 404, such as U2X-DATA. The aerial UEs 104' may utilize the D2D interface 404 to provide control information and/or data to neighboring aerial UEs 104'. For example, the aerial UE 104' may broadcast position and/or trajectory data to the neighboring aerial UEs 104' for collision avoidance and/or cooperative adaptive control purposes. That is, the aerial UEs 104' may coordinate their trajectory and/or movements with neighboring aerial UEs 104' over the D2D interface 404.

Alternatively or additionally, the aerial UE 104' may broadcast identification, trajectory information, and/or alerts (e.g., malfunctions, collisions) of the aerial UE 104' over a U2X identification (U2X-ID) interface 406. In some aspects, a security entity 410 (e.g., air traffic control personnel, civil authorities) may monitor the U2X-ID interface 406 to obtain relevant information of the aerial UEs 104' located in a particular area. In other aspects, the aerial UE 104' may broadcast sensory data (e.g., audio, pictures, video frames, infrared, radar) over the U2X-ID interface 406.

In some aspects, the aerial UE 104' may establish a communications link over interface 402 with a mobile network (e.g., access network 100 of FIG. 1). For example, the aerial UE 104' may connect to a base station 102 (e.g., network device, eNodeB, gNB) using a Uu interface. That is, the aerial UE 104' and the base station 102 may exchange command and control information over the interface 402. The command and control information may include, but not be limited to, flight control commands, sensor control commands, as well as, position, trajectory data (e.g., height, velocity, heading, yaw angle), status information (e.g., power reserve level, motor rotation speed). Alternatively or additionally, the aerial UE 104' may transmit sensory data (e.g., audio, pictures, video frames) to the base station 102 over the interface 402.

Figure 5A:
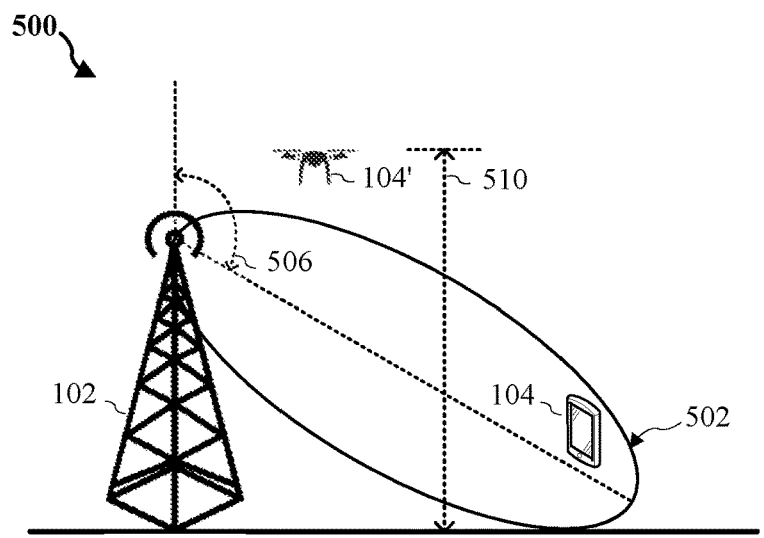
FIG. 5A is a diagram illustrating an example of a terrestrial cell for wireless communications, in accordance with various aspects of the present disclosure.

FIG. 5A illustrates an example base station 102 (e.g., network device, eNodeB, gNB) generating an example terrestrial cell 502. The terrestrial cell 502 may have one or more terrestrial sectors formed by one or more downtilted beams generated by the base station 102. The downtilted beams may be beams having a downward tilt angle (e.g., towards the ground). In some aspects, the base station 102 may utilize beamforming techniques, such as MIMO, to form the terrestrial cell 502. The terrestrial cell 502 may have a tilt angle 506 such that the coverage area of the terrestrial cell 502 generally points towards the ground. That is, the one or more downtilted beams generated by the base station 102 that form the terrestrial cell 502 may result in the terrestrial cell 502 having an overall downtilt angle (e.g., tilt angle 506). As such, the shape and size of the coverage area of the terrestrial cell 502 may be affected by interference, multipath, and/or blockages (e.g., coverage dead spots) created by artificial structures (e.g., high-rise building, bridge, etc.) and/or natural features of the terrain (e.g., mountain, change in elevation). However, moving the terrestrial cell 502 upwards (i.e., decreasing the tilt angle 506), to decrease such effects, may increase inter-cell interference. For example, terrestrial UEs 104 located near an edge of the terrestrial cell 502 may experience an increase of interference from neighboring terrestrial cells.

In some aspects, the aerial UE 104' may be located within an antenna sidelobe beam of the terrestrial cell 502. That is, the aerial UE 104' may be located above the antenna boresight (e.g., height 510) of the base station 102, and, as such, may be within an antenna sidelobe of the base station 102. In such an aspect, the aerial UE 104' may be served by the terrestrial cell 502. However, the presence of possible nulls in the antenna sidelobes may cause the aerial UE 104' to receive a stronger cell signal from another base station 102 (not shown) that is more geographically distant to the aerial UE 104' than the nearest base station 102. As such, the aerial UE 104' may expend additional power to establish a communications link with the geographically distant network device when compared to connecting to the nearest base station 102. In other aspects, the aerial UE 104' may be unable to establish a communications link with the base station 102 due to interference from another geographically distant base station. That is, a maximum transmit power of the aerial UE 104' may be insufficient to overcome a path loss of signals transmitted by the geographically distant base station. As such, the interference from the geographically distant base station may prevent successful completion of the communications link establishment procedure (e.g., random access channel (RACH) procedure) with the base station 102. Alternatively or additionally, the aerial UE 104' may be more likely to experience poor downlink signal-to-noise ratio (SNR) when compared to the terrestrial UE 104 as a result of the higher downlink interference from non-serving neighboring cells.

Figure 5B:
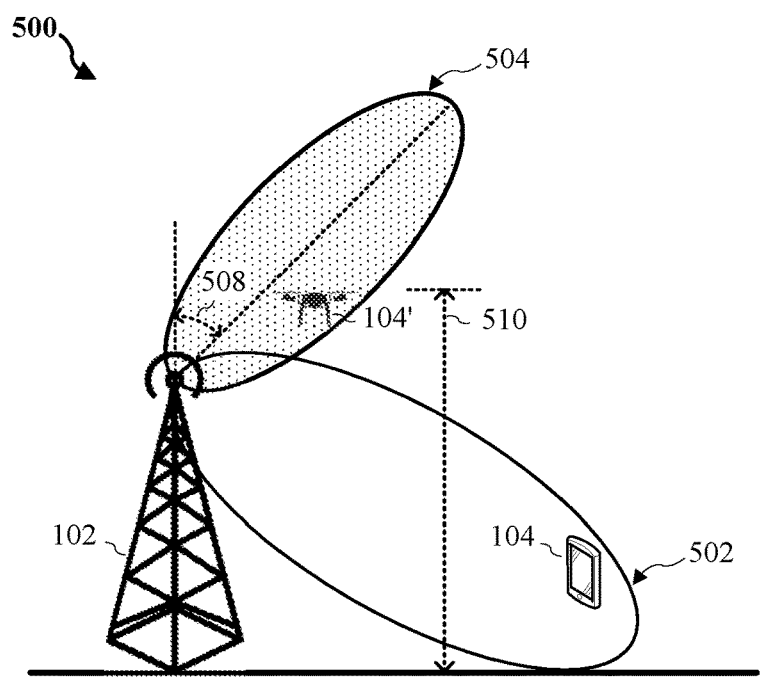
FIG. 5B is a diagram illustrating an example of an aerial cell for wireless communications with aerial UEs, in accordance with various aspects of the present disclosure.

FIG. 5B illustrates an example base station 102 (e.g., network device, eNodeB, gNB) generating an example terrestrial cell 502 and an example aerial cell 504. In some aspects, the base station 102 may generate an aerial cell 504 for use by aerial UEs 104'. In other aspects, the aerial cell 504 may be an aerial sector and may share a same cell identifier with the terrestrial cell 502. Alternatively or additionally, the aerial cell 504 may comprise one or more aerial sectors and/or one or more terrestrial sectors sharing a same cell identifier. The aerial cell and/or aerial sector 504 may be formed by one or more uptilted beams generated by the base station 102. The uptilted beams may be beams having a upward tilt angle (e.g., away from the ground). In some aspects, the base station 102 may utilize beamforming techniques, such as MIMO, to form the aerial cell and/or aerial sector 504. The aerial cell and/or aerial sector 504 may have a tilt angle 508 such that the coverage area of the aerial cell and/or aerial sector 504 generally points away from the ground (e.g., towards the sky). That is, the one or more uptilted beams generated by the base station 102 that form the aerial cell 504 may result in the aerial cell and/or aerial sector 504 having an overall uptilt angle (e.g., tilt angle 508). As such, the shape and size of the coverage area of the aerial cell and/or aerial sector 504 may depend mostly on line-of-sight, as the aerial cell and/or aerial sector 504 are likely to avoid interference from artificial structures and/or natural features of the terrain that affect the terrestrial cell 502. Alternatively or additionally, the aerial cell 504 may refer to one or more cell sectors of the base station 102.

In some aspects, the aerial cell and/or aerial sector 504 may be limited for use by aerial UEs 104'. That is, terrestrial UEs 104 may be prevented from using the aerial cell and/or aerial sector 504 and aerial UEs 104' may be prioritized into using the aerial cell and/or aerial sector 504. Alternatively or additionally, the aerial UE 104' may be configured to use the terrestrial cell 502 if or when the height 510 of the aerial UE 104' does not exceed a height threshold. That is, the aerial UE 104' may establish a communications link with the base station 102 over the terrestrial cell 502 if or when the aerial UE 104' is below a height threshold (e.g., on the ground). Conversely, the aerial UE 104' may establish a communications link with the base station 102 over the aerial cell and/or aerial sector 504 if or when the aerial UE 104' exceeds the height threshold (e.g., flying above the ground at a height 510 exceeding the height threshold). In some aspects, the height threshold may be a predetermined value. Alternatively or additionally, the height threshold may be provided to the aerial UE 104' by the base station 102. The height threshold may vary based on a height of the base station 102 and/or an antenna beam configuration of the base station 102. For example, the base station 102 may configure distinct height threshold values for multiple aerial cells and/or aerial sectors 504 with uptilt beams covering different height levels. For example, the base station 102 may transmit a master information block (MIB) and/or a system information block (SIB) indicating whether or not the aerial cell 504 (e.g., uptilt beams) is enabled (e.g., active). Additionally or alternatively, the base station may transmit a SIB comprising the height threshold.

In other aspects, the base station 102 may transmit system information blocks (e.g., MIB, SIBs) that comprise parameters dedicated for the aerial UEs 104' and/or the aerial cells and/or aerial sectors 504. That is, the dedicated parameters may only be used by aerial UEs 104' for communications using the aerial cells and/or aerial sectors 504. Alternatively or additionally, the terrestrial UEs 104 (e.g., conventional UEs) may use conventional parameters for configuration and for establishing communications links with the terrestrial cell 502.

In other optional or additional aspects, the base station 102 may deploy the terrestrial cell 502 in a first operating frequency band (e.g., FR1, FR2) and may deploy the aerial cell and/or aerial sector 504 in a second operating frequency band (e.g., FR1, FR2). For example, the first operating frequency band (e.g., FR1) of the terrestrial cell 502 may be the same as the second operating frequency band (e.g., FR1) of the aerial cell and/or aerial sector 504. In another example, the first operating frequency band (e.g., FR1) of the terrestrial cell 502 may differ from the second operating frequency band (e.g., FR2) of the aerial cell and/or aerial sector 504. In yet another example, the second operating frequency band of the aerial cell and/or aerial sector 504 may be within a frequency spectrum dedicated for UAV communications.

In other optional or additional aspects, the base station 102 may be configured to deploy a first combination of terrestrial cells and/or terrestrial sectors 502 and to deploy a second combination of aerial cells and/or aerial sectors 504. In some aspects, the first combination of terrestrial cells and/or terrestrial sectors 502 may differ from the second combination of aerial cells and/or aerial sectors 504. For example, the base station 102 may deploy a smaller quantity of aerial cells and/or aerial sectors 504 than the quantity of terrestrial cells 502. In other aspects, the first combination of terrestrial cells and/or terrestrial sectors 502 may match the second combination of aerial cells and/or aerial sectors 504. For example, the base station 102 may deploy a same quantity of aerial cells 504 and of terrestrial cells 502.

In other optional or additional aspects, the base station 102 may be configured to deploy the aerial cell and/or aerial sector 504. In other aspects, the base station 102 may be configured to prevent deployment of the aerial cell and/or aerial sector 504. That is, deployment of the aerial cell and/or aerial sector 504 may be an optional feature of the base station 102 that may be enabled or disabled in some aspects.

Continuing to refer to FIG. 5B, the base station 102 may periodically transmit system information to allow other wireless communication devices (e.g., terrestrial UEs 104, aerial UEs 104') to synchronize with the wireless communication system. In some aspects, the system information may comprise one or more SSBs and/or one or more SIBs. Alternatively or additionally, the system information may comprise one or more CSI-RS. The base station 102 may transmit the system information over the terrestrial cell 502 and/or the aerial cell and/or aerial sector 504. In some aspects, the system information may comprise an indication of the transmit power level at which the signals carrying the system information were transmitted. For example, the one or more SIBs may comprise an indication of the transmit power level of a corresponding SSB (e.g., ss-PBCH-Block-Power). The terrestrial UEs 104 and/or the aerial UEs 104' may perform a path loss calculation based on the indication of the transmit power level as part of a RACH procedure. In other aspects, the system information may comprise at least one cell bias parameter with which the terrestrial UEs 104 and/or aerial UEs 104' may select a next serving cell as part of a cell selection and/or cell re-selection (e.g., handover) procedure. For example, the one or more SIBs may comprise at least one of a bias offset per serving cell, a bias offset for each neighboring cell in an intra-frequency cell list, and a bias offset for each neighboring cell in an inter-frequency cell list. That is, the terrestrial UEs 104 and/or aerial UEs 104' may calculate cell selection and/or cell re-selection criteria based on the bias offsets comprised by the one or more SIBs, and may determine whether to perform a cell selection and/or cell re-selection (e.g., handover) procedure according to the criteria.

In some aspects, the cell bias offsets may be configured based on the UE types (e.g., terrestrial, aerial) and different UE status (e.g., on the ground, in an aerial state). For example, the aerial cell and/or aerial sector 504 may configure a cell bias offset dedicated for aerial UEs 104' (e.g., aerial UEs 104' with a height that exceeds the height threshold) that may prioritize access to the aerial cell 504 to aerial UEs 104' over terrestrial UEs 104 and/or aerial UEs 104' that are on the ground. That is, terrestrial UEs 104 and/or aerial UEs 104' that are on the ground may continue to access the terrestrial cell 502 while aerial UEs 104' access the aerial cell 504. Alternatively or additionally, the base station 102 may configure additional parameters (e.g., parameters for cell access control, barring information, cell priorities, intra-frequency cell lists, inter-frequency cell lists) based on the UE types and different UE status. Advantageously, the dedicated parameters for aerial UEs 104' may prioritize access to the aerial cell 504 to aerial UEs 104' over terrestrial UEs 104 and/or aerial UEs 104' that are on the ground.

Alternatively or additionally, the base station 102 may transmit one or more legacy (e.g., conventional) SIBs over the terrestrial cell 502 and/or may transmit one or more aerial SIBs over the aerial cell and/or aerial sector 504. The aerial SIBs may differ from the legacy SIBs in that the aerial SIBs may comprise additional parameters dedicated to the aerial cell and/or aerial sector 504 and/or the aerial UEs 104', as described in further detail below.

For example, the aerial SIBs may comprise an indication of a height threshold that the aerial UE 104' must exceed in order to use the aerial SSBs for access to the aerial cell and/or aerial sector 504. That is, the aerial UE 104' may establish a communications link with the base station 102 over the aerial cell and/or aerial sector 504 if or when the aerial UE 104' exceeds the height threshold (e.g., flying above the ground at a height 510 exceeding the height threshold) indicated by the aerial SIBs.

Alternatively or additionally, the aerial SIBs may comprise at least one of a transmit power level (e.g., ss-PBCH-BlockPower_AerialUAV) and a transmit power level offset (e.g., ss-PBCH-BlockPowerOffset_AerialUAV) for at least a portion of the aerial SSBs. The transmit power level may indicate a transmit power level of the corresponding SSB index for the aerial SSB. For example, the base station 102 may transmit a portion of the aerial SSBs at a particular transmit power level and transmit another portion of the aerial SSBs at a different transmit power level. The transmit power level offset may indicate a transmit power level difference between the aerial SSBs and the terrestrial SSBs. That is, the transmit power level offset may indicate the transmit power level of the aerial SSBs relative to the terrestrial SSBs. The aerial UE 104' may determine a path loss for the aerial cell 504 based at least one the transmit power level and/or the transmit power level offset indicated by the aerial SSBs.

In some aspects, the aerial cell and/or aerial sector 504 may be configured with SSB-specific and/or SSB-group-specific bias parameters. For example, the aerial cell and/or aerial sector 504 may be configured with a first set of terrestrial SSBs with SSB index X and with a second set of aerial SSBs with SSB index Y. The first set of terrestrial SSBs may have different configuration parameters from the second set of aerial SSBs. In some aspects, the bias parameters for the aerial SSBs may be dedicated to aerial UEs 104', with which the aerial UEs 104' may perform cell ranking according to the different bias parameters for the different sets of SSBs as part of a cell selection and/or cell re-selection (e.g., handover) procedure. For example, a SIB may comprise at least one of a SSB-specific or SSB-group-specific bias offset per serving cell, SSB-specific or SSB-group-specific bias offsets for each neighboring cell in an intra-frequency aerial cell list, and SSB-specific or SSB-group-specific bias offsets for each neighboring cell in an inter-frequency aerial cell list. Alternatively or additionally, the SIB may comprise multiple intra-frequency and/or inter-frequency cell list to separate the cells with or without aerial SSBs. The aerial cell bias parameters may be selected to prioritize selection of an aerial cell 504 over a terrestrial cell 502.

In other optional or additional aspects, the base station 102 may be configured to broadcast one or more SIBs over the aerial cell and/or aerial sector 504. The one or more SIBs may comprise an aerial CSI-RS configuration. The aerial CSI-RS configuration indicating whether CSI-RS broadcasts are enabled for the aerial cell and/or aerial sector 504. Alternatively or additionally, the aerial UE 104' may be configured to receive, according to the CSI-RS configuration indicated by the SIBs, one or more aerial CSI-RS. The one or more SIBs may comprise an indication of a transmit power level for the CSI-RS (e.g., powerControlOffset) and/or an indication of the transmit power level for the CSI-RS relative to the transmit power of the associated SSBs (e.g., powerControlOffsetSS). The associated SSB may be a terrestrial (e.g., legacy) SSB or an aerial SSB. The aerial UE 104' may be further configured to calculate a path loss as part of the RACH procedure based at least on the transmit power level of the CSI-RS indicated by the one or more SIBs.

In other optional or additional aspects, the base station 102 may be configured to transmit one or more legacy (e.g., conventional) SSBs over the terrestrial cell 502 and to broadcast aerial CSI-RS over the aerial cell and/or aerial sector 504. In such aspects, the aerial UE 104' may be configured to receive the one or more legacy SSBs over the terrestrial cell 502 and to receive the aerial CSI-RS over the aerial cell and/or aerial sector 504. The aerial CSI-RS transmit power level may be indicated as an absolute value or as a value relative (e.g., offset) to the transmit power level of the associated SSBs. The aerial UE 104' may be further configured to establish a communications link over the aerial cell 504 and/or to perform a cell selection and/or cell re-selection (e.g., handover) procedure based at least on the aerial CSI-RS. For example, the aerial UE 104' may establish a communications link with the base station 102 over the terrestrial cell 502 (e.g., prior to taking off the ground and/or while flying at a height 510 that does not exceed the height threshold). The aerial UE 104' may climb to a new height 510 that exceeds the height threshold, and, in response, may initiate a handover procedure to switch from the terrestrial cell 502 to the aerial cell and/or aerial sector 504 of the base station 102.

In other optional or additional aspects, the base station 102 may be configured to transmit one or more aerial SSBs and to transmit aerial CSI-RS according to the aerial CSI-RS configuration indicated by the aerial SIBs. Alternatively or additionally, the base station 102 may transmit the one or more aerial SSBs using wide uptilt beams of the aerial cell 504 and/or may broadcast the aerial CSI-RS using narrow uptilt beams of the aerial cell 504. That is, the base station 102 may utilize beamforming techniques to generate uptilt beams with a wide shape for the transmission of the one or more aerial SSBs and to generate uptilt beams with a narrow shape for the transmission of the aerial CSI-RS. In such aspects, the aerial UE 104' may be configured to detect the one or more aerial SSBs over the aerial cell and/or aerial sector 504 and to detect the aerial CSI-RS over the aerial cell and/or aerial sector 504. For example, the aerial SIBs may indicate that CSI-RS transmissions are enabled for the aerial SSBs and/or the aerial cell 504. Alternatively or additionally, the aerial SIBs may indicate a CSI-RS transmit power level and/or an CSI-RS transmit power level offset relative to the aerial SSBs and/or the aerial cell 504. The aerial UE 104' may be further configured to perform establish a communications link over the aerial cell 504 and/or perform a cell selection and/or cell re-selection (e.g., handover) procedure based at least on the aerial CSI-RS.

In other optional or additional aspects, the base station 102 may be configured to transmit one or more aerial SIBs that comprise reference signal received power (RSRP)/reference signal received quality (RSRQ) bias values and/or RSRP/RSRQ bias offset values for at least a portion of the aerial SSBs of the serving aerial cell and/or aerial sector 504 and for at least a portion of the aerial SSBs of the neighboring aerial cells and/or aerial sectors. In such aspects, the aerial UE 104' may be configured to calculate cell reselection criteria, such as quality and receive level parameters, based at least on the RSRP/RSRQ bias values and/or the RSRP/RSRQ bias offset values. Based on the cell reselection criteria, the aerial UE 104' may determine whether or not to perform a cell selection and/or re-selection (e.g., handover) procedure.

The one or more aerial SIBs may comprise RSRP/RSRQ bias values and/or the RSRP/RSRQ bias offset values of the serving aerial cell and/or aerial sector 504 and/or RSRP/RSRQ bias values and/or the RSRP/RSRQ bias offset values of a list of aerial SSBs in the serving aerial cell and/or aerial sector 504. For example, the one or more aerial SSBs may comprise these RSRP/RSRQ bias values and/or the RSRP/RSRQ bias offset values in a cellSelectionInfo field of SIB1 of the aerial SSBs.

The one or more aerial SIBs may comprise the RSRP/RSRQ bias values and/or the RSRP/RSRQ bias offset values of an intra-frequency neighboring aerial cell and/or RSRP/RSRQ bias values and/or the RSRP/RSRQ bias offset values of a list of aerial SSBs in the intra-frequency neighboring aerial cell. For example, the one or more aerial SIBs may comprise these RSRP/RSRQ bias values and/or the RSRP/RSRQ bias offset values in a IntraFreqNeighCellInfo field of SIB3 of the aerial SIBs.

The one or more aerial SIBs may comprise RSRP/RSRQ bias values and/or the RSRP/RSRQ bias offset values of an inter-frequency neighboring aerial cell and/or RSRP/RSRQ bias values and/or the RSRP/RSRQ bias offset values of a list of aerial SSBs in the inter-frequency neighboring aerial cell. For example, the one or more aerial SIBs may comprise these RSRP/RSRQ bias values and/or the RSRP/RSRQ bias offset values in a InterFreqNeighCellInfo field of SIB4 of the aerial SIBs.

The aerial UE 104' may be configured to compare at least one signal characteristic of the CSI-RS signal (e.g., measured cell quality value, measure cell receive level value) to one or more of a set of cell reselection criteria to determine whether or not to perform a cell selection and/or cell re-selection (e.g., handover) procedure. For example, the set of cell reselection criteria may comprise a quality parameter and a receive level parameter. In some aspects, the aerial UE 104' may be configured to calculate the cell reselection criteria for the aerial cell and/or aerial sector 504 using the following equations:

$$Srxlev = Qrxlevmeas - (Qrxlevmin + Qrxlevminoffset) - Pcompensation - Qoffsettemp + Qrxlevoffset\_AerialUE \quad (Eq. 1)$$

$$Squal = Qqualmeas - (Qqualmin + Qqualminoffset) - Qoffsettemp + Qqualoffset\_AerialUE \quad (Eq. 2)$$

where:

| | |
|---|---|
| Srxlev | Cell Selection receive (RX) level value |
| Squal | Cell Selection quality value |
| Qoffsettemp | Offset temporarily applied to the cell |
| Qqualmeas | Measured cell quality value |
| Qqualmin | Minimum required quality level in the cell |
| Qqualminoffset | Offset to the signaled Qqualmin |
| Qqualoffset_AerialUE | Aerial UE dedicated offset taken into account in the Squal evaluation |
| Qrxlevmeas | Measured cell RX level value |
| Qrxlevmin | Minimum required RX level in the cell |
| Qrxlevminoffset | Offset to the signaled Qrxlevmin |
| Qrxlevoffset_AerialUE | Aerial UE dedicated offset taken into account in the Srxlev evaluation |
| Pcompensation | Difference between maximum transmit power level of the aerial UE and the maximum RF output power of the aerial UE according to the power class of the aerial UE |

Referring to Eqs. 1 and 2, the cell reselection criteria values (i.e., Srxlev and Squal) may result in assigning a higher priority to aerial cells (e.g., aerial cell and/or aerial sector 504) over terrestrial cells (e.g., terrestrial cell 502). For example, an increase of the aerial UE dedicated offsets (i.e., Qqualoffset_AerialUE and Qrxlevoffset_AerialUE) may increase a probability that the aerial UE 104' may select an aerial cell (e.g., aerial cell and/or aerial sector 504) over a terrestrial cell (e.g., terrestrial cell 502).

In other optional or additional aspects, the base station 102 may be configured to transmit one or more aerial SIBs that comprise priority configurations for intra-frequency neighboring aerial cells and/or priority configurations for inter-frequency neighboring aerial cells. In such aspects, the aerial UE 104' may be configured to determine whether or not to perform a cell selection and/or re-selection (e.g., handover) procedure based at least on the priority configurations of the one or more aerial SIBs. These priority configurations may increase a probability that the aerial UE 104' may select an aerial cell (e.g., aerial cell and/or aerial sector 504) over a terrestrial cell (e.g., terrestrial cell 502).

The one or more aerial SIBs may comprise priority configuration of an intra-frequency neighboring aerial cell and/or priority configuration of a list of aerial SSBs in the intra-frequency neighboring aerial cell. For example, the one or more aerial SIBs may comprise these priority configurations in a cellReselectionPriorityCell_AerialUAV field of the IntraFreqNeighCellInfo field in the SIB3 for the intra-frequency neighboring aerial cell. The cellReselectionPriorityCell_AerialUAV field may be distinct and/or separate from the cellReselectionServingFreqInfo field in the SIB3.

The one or more aerial SIBs may comprise priority configuration of an inter-frequency neighboring aerial cell and/or priority configuration of a list of aerial SSBs in the inter-frequency neighboring aerial cell. For example, the one or more aerial SIBs may comprise these priority configurations in a cellReselectionPriorityCell_AerialUAV field of the InterFreqNeighCellInfo field in the SIB4 for the inter-frequency neighboring aerial cell. The cellReselectionPriorityCell_AerialUAV field may be distinct and/or separate from the InterFreqCarrierFreqInfo field in the SIB4.

In other optional or additional aspects, the base station 102 may be configured to transmit terrestrial SSBs at a first periodicity (e.g., transmit terrestrial SSBs every 20 milliseconds), to transmit aerial SSBs at a second periodicity (e.g., transmit aerial SSBs every 40 milliseconds), and to broadcast the aerial CSI-RS at a third periodicity (e.g., broadcast CSI-RS every 10 milliseconds). In some aspects, the first periodicity, the second periodicity, and the third periodicity may differ from one another. For example, the terrestrial SSBs may be transmitted in 20 millisecond periods, the aerial SSBs may be transmitted in 40 millisecond periods, and the aerial CSI-RS may be broadcast in 10 millisecond periods. In other aspects, the first periodicity, the second periodicity, and the third periodicity may be configured according to default or predetermined values. Alternatively or additionally, the first periodicity, the second periodicity, and the third periodicity may be configured according to configuration information transmitted by the base station 102. For example, the CSI-RS may be broadcast at a particular periodicity (e.g., 10 milliseconds, 20 milliseconds, 40 milliseconds, or 80 milliseconds) according to the CSI-RS configuration comprised by the terrestrial SIBs and/or the aerial SIBs.

Figure 6:
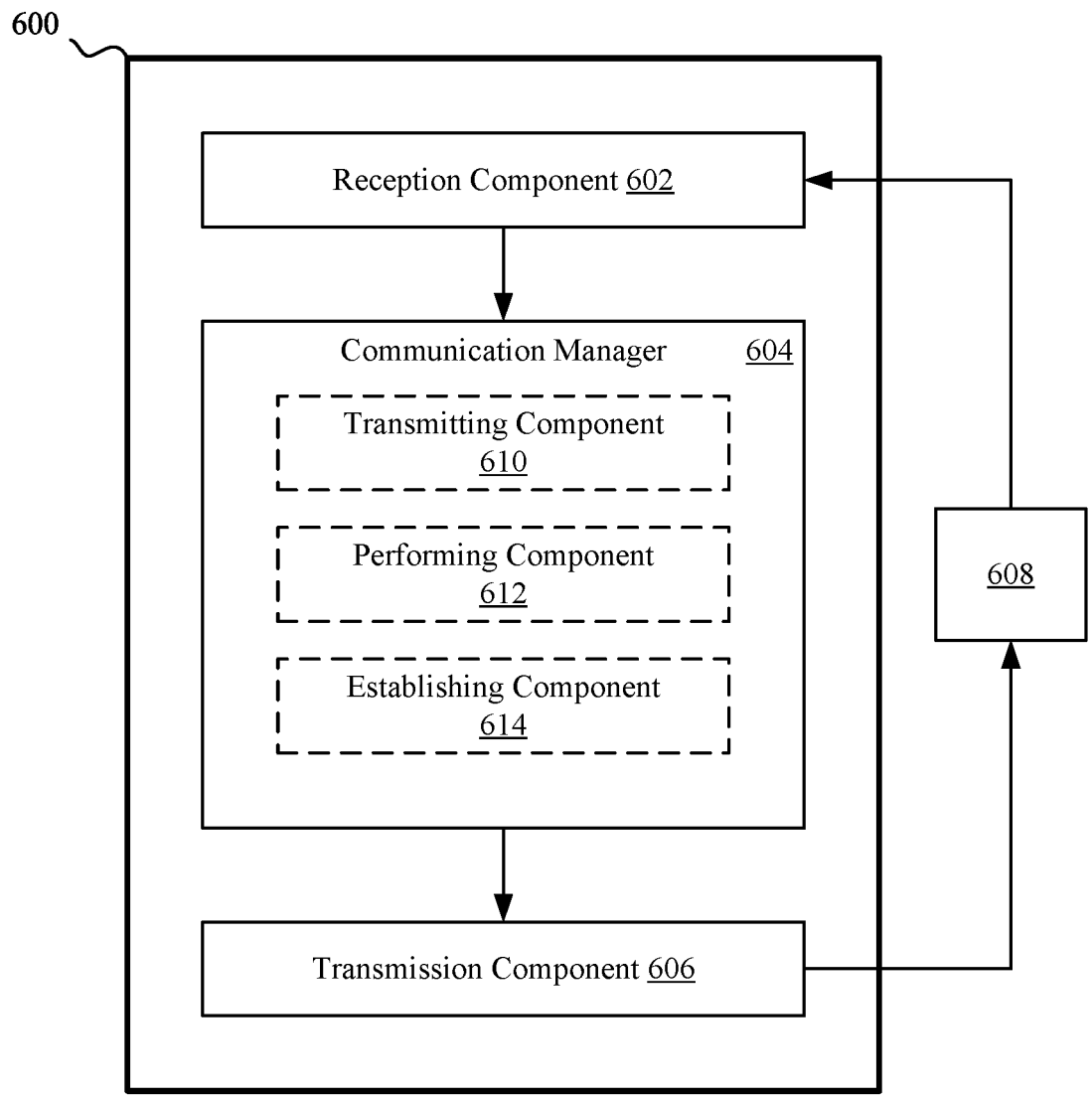
FIG. 6 is a block diagram of an example apparatus such as a base station for wireless communication with aerial UEs, in accordance with various aspects of the present disclosure.

FIG. 6 is a block diagram of an example apparatus 600 for wireless communication. The apparatus 600 may be a base station (e.g., base station 102 of FIGS. 1 and 3-5) or a base station may include the apparatus 600. In some aspects, the apparatus 600 includes a reception component 602 configured to receive communications from another apparatus (e.g., apparatus 608), a communication manager 604 configured to provide aerial cells for wireless communications, a transmission component 606 configured to transmit communications to the apparatus 608, and which may be in communication with one another (for example, via one or more buses or electrical connections). As shown, the apparatus 600 may be in communication with another apparatus 608 (such as an aerial UE 104', a terrestrial UE 104, or another client-side wireless communication device) using the reception component 602 and the transmission component 606.

In some aspects, the apparatus 600 may be configured to perform one or more operations described herein in connection with FIGS. 4-5. Additionally or alternatively, the apparatus 600 may be configured to perform one or more processes described herein, such as method 800 of FIG. 8. In some aspects, the apparatus 600 may include one or more components of the base station 102 described above in connection with FIGS. 1 and 3-5.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 602 may include one or more antennas, a demodulator, a MIMO detector, a receiver, a receive processor, a controller/processor, a memory, or a combination thereof, of the base station 102 described above in connection with FIGS. 1 and 3-5.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 608. In other aspects, the transmission component 706 may include one or more antennas, a modulator, a transmit MIMO processor, a transmitter, a transmit processor, a controller/processor, a memory, or a combination thereof, of the base station 102 described above in connection with FIGS. 1 and 3-5. In some aspects, the transmission component 606 may be co-located with the reception component 602 in a transceiver or transceiver component.

The communication manager 604 may transmit system information corresponding to an aerial cell and/or aerial sector 504 of the mobile network, perform a RACH procedure with an aerial UE 104' according to the system information, and establish a communications link with the aerial UE 104' via the aerial cell and/or aerial sector 504. In some aspects, the communication manager 604 may include a controller/processor, a memory, or a combination thereof, of the base station 102 described above in connection with FIGS. 1 and 3-5.

In some aspects, the communication manager 604 may include a set of components, such as a transmitting component 610, a performing component 612, and an establishing component 614, or a combination thereof. Alternatively, the set of components may be separate and distinct from the communication manager 604. In some aspects, one or more components of the set of components may include or may be implemented within a controller/processor, a memory, or a combination thereof, of the UE described above in connection with FIGS. 1 and 3-5. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmitting component 610 may transmit system information corresponding to an aerial cell and/or aerial sector 504 of the mobile network. For example, the transmitting component 610 may transmit first configuration information of the serving cell 504 and second configuration information of one or more neighbor cells. Alternatively or additionally, the transmitting component 610 may transmit third configuration information of an aerial sector in the serving cell 504 and fourth configuration information of one or more aerial sectors in the one or more neighbor cells. In another example, the transmitting component 610 may transmit a synchronization signal comprising the system information, the system information indicating at least one of a transmit power level and a transmit power offset of the synchronization signal. In another example, the transmitting component 610 may transmit, at a first power level, a first SSB of a plurality of SSBs, and transmit, at a second power level, a second SSB of the plurality of SSBs, the first power level being different than the second power level. In another example, the transmitting component 610 may transmit, at a first power level, a SIB indicating a CSI-RS configuration for the aerial cell and/or aerial sector 504, and transmit, at a second power level and according to the CSI-RS configuration, a CSI-RS, the first power level being different than the second power level. In another example, the transmitting component 610 may transmit a terrestrial SSB of a plurality of terrestrial SSBs, and transmit a CSI-RS according to a CSI-RS configuration, the CSI-RS configuration being based at least on the terrestrial SSB. In another example, the transmitting component 610 may transmit, via a first uptilt beam of the one or more uptilt beams, an aerial SSB of the first portion of the plurality of SSBs, and transmit, via a second uptilt beam of the one or more uptilt beams and according to the CSI-RS configuration, a CSI-RS. In another example, the transmitting component 610 may transmit first system information indicating first bias offsets of the serving aerial cell and/or aerial sector 504, and transmit second system information indicating second bias offsets of one or more neighbor cells. The first bias offsets and the second bias offsets may be configured to prioritize selection of aerial cells and/or aerial sectors by the aerial UE 104'. In another example, the transmitting component 610 may transmit system information of one or more neighbor cells, the system information indicating at least one of an intra-frequency cell reselection priority and an inter-frequency cell reselection priority, the intra-frequency cell reselection priority and the inter-frequency cell reselection priority may be configured to prioritize selection of aerial cells and/or aerial sectors by the aerial UE 104'.

The performing component 612 may perform, according to the system information, a RACH procedure with the an aerial UE 104'. Alternatively or additionally, the performing component 612 may perform a cell reselection procedure in response to a determination based at least on cell reselection criteria calculated using the first bias offsets and the second bias offsets. For another example, the performing component 612 may perform a cell reselection procedure in response to a determination based at least on the intra-frequency cell reselection priority and the inter-frequency cell reselection priority.

The establishing component 614 may establish, via the aerial cell and/or aerial sector 504, a communications link with the aerial UE 104'.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Alternatively or additionally, a set of (one or more) components shown in FIG. 6 may perform one or more functions described as being performed by another set of components shown in FIGS. 1, and 3-5 (e.g., BS aerial cell component 188).

Figure 7:
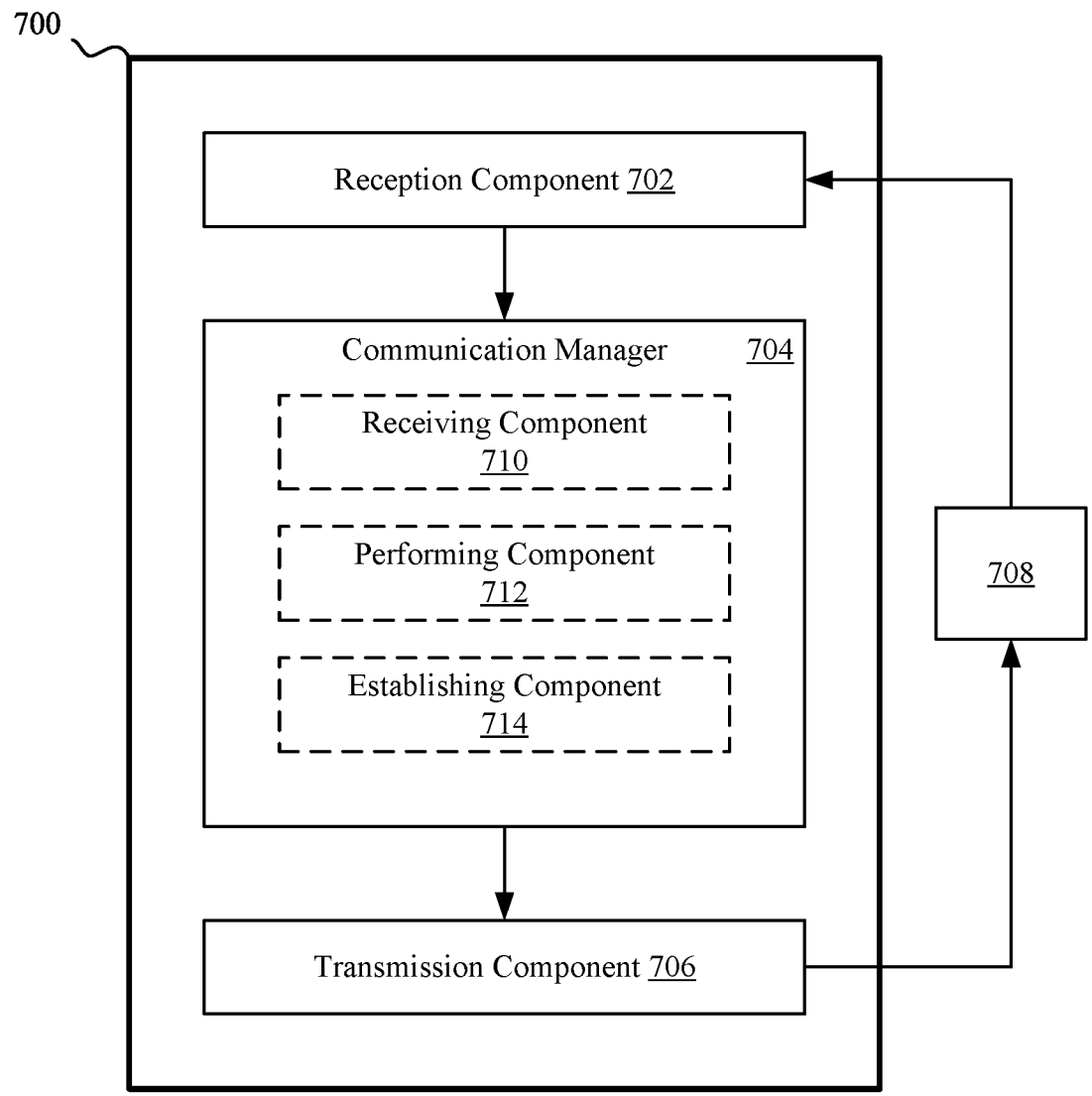
FIG. 7 is a block diagram of an example apparatus such as an aerial UE for wireless communications with a base station, in accordance with various aspects of the present disclosure.

FIG. 7 is a block diagram of an example apparatus 700 for wireless communication. The apparatus 700 may be an aerial UE (e.g., aerial UE 104' of FIGS. 1 and 3-5) or an aerial UE may include the apparatus 700. In some aspects, the apparatus 700 includes a reception component 702 configured to receive communications from another apparatus (e.g., apparatus 708), a communication manager 704 configured to establish communications link with wireless communications system via aerial cells, a transmission component 706 configured to transmit communications to the apparatus 708, and which may be in communication with one another (for example, via one or more buses or electrical connections). As shown, the apparatus 700 may be in communication with another apparatus 708 (such as base station 102, or another network-side wireless communication device) using the reception component 702 and the transmission component 706.

In some aspects, the apparatus 700 may be configured to perform one or more operations described herein in connection with FIGS. 4-5. Additionally or alternatively, the apparatus 700 may be configured to perform one or more processes described herein, such as method 900 of FIG. 9. In some aspects, the apparatus 700 may include one or more components of the aerial UE 104' described above in connection with FIGS. 1 and 3-5.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 702 may include one or more antennas, a demodulator, a MIMO detector, a receiver, a receive processor, a controller/processor, a memory, or a combination thereof, of the aerial UE 104' described above in connection with FIGS. 1 and 3-5.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In other aspects, the transmission component 706 may include one or more antennas, a modulator, a transmit MIMO processor, a transmitter, a transmit processor, a controller/processor, a memory, or a combination thereof, of the aerial UE 104' described above in connection with FIGS. 1 and 3-5. In some aspects, the transmission component 706 may be co-located with the reception component 702 in a transceiver or transceiver component.

The communication manager 704 may receive system information corresponding to an aerial cell and/or aerial sector 504 of the mobile network, perform a RACH procedure with the mobile network according to the system information; and establish a communications link with the mobile network via the aerial cell and/or aerial sector 504. In some aspects, the communication manager 704 may include a controller/processor, a memory, or a combination thereof, of the aerial UE 104' described above in connection with FIGS. 1 and 3-5.

In some aspects, the communication manager 704 may include a set of components, such as a receiving component 710, a performing component 712, and an establishing component 714, or a combination thereof. Alternatively, the set of components may be separate and distinct from the communication manager 704. In some aspects, one or more components of the set of components may include or may be implemented within a controller/processor, a memory, or a combination thereof, of the UE described above in connection with FIGS. 1 and 3-5. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The receiving component 710 may receive, from the mobile network, system information corresponding to an aerial cell and/or aerial sector 504 of the mobile network, the aerial cell 504 having at least one aerial sector being formed by one or more uptilt beams of the base station 102 of the mobile network. For example, the receiving component 710 may receive, in response to determining that the height of the aerial UE 104' exceeds the height threshold, the system information corresponding to the aerial cell and/or aerial sector 504 of the mobile network. For another example, the receiving component 710 may receive first configuration information of the serving cell 504 and second configuration information of one or more neighbor cells. Alternatively or additionally, the receiving component 710 may receive third configuration information of an aerial sector in the serving cell 504 and fourth configuration information of one or more aerial sectors of the one or more neighbor cells. For another example, the receiving component 710 may receive a synchronization signal comprising the system information, the system information indicating at least one of a transmit power level and a transmit power offset of the synchronization signal. For another example, the receiving component 710 may receive a first SSB of a plurality of SSBs, the first SSB having been transmitted a first power level, and receive a second SSB of the plurality of SSBs, the second SSB having been transmitted a second power level, the first power level being different than the second power level. For another example, the receiving component 710 may receive a SIB indicating a CSI-RS configuration for the aerial cell and/or aerial sector 504, the SIB having been transmitted at a first power level, and receive, according to the CSI-RS configuration, a CSI-RS, the CSI-RS having been transmitted a second power level, the first power level being different than the second power level. For another example, the receiving component 710 may receive a terrestrial SSB of a plurality of terrestrial SSBs, determine a CSI-RS configuration for the aerial cell based at least on the terrestrial SSB, and receive, according to the CSI-RS configuration, a CSI-RS. For another example, the receiving component 710 may receive an aerial SSB of the first portion of the plurality of SSBs, the aerial SSB indicating a CSI-RS configuration for the aerial cell and/or aerial sector 504, the aerial SSB having been transmitted via a first uptilt beam of the one or more uptilt beams, and receive, according to the CSI-RS configuration, a CSI-RS, the CSI-RS having been transmitted via a second uptilt beam of the one or more uptilt beams, the first uptilt beam having a wider shape than the second uptilt beam. For another example, the receiving component 710 may receive first bias offsets of the serving cell and/or serving sector 504, the first bias offsets being configured to prioritize selection of aerial cells and/or aerial sectors by the aerial UE 104', and receive second bias offsets of one or more neighbor cells, the second bias offsets may be configured to prioritize selection of aerial cells and/or aerial sectors by the aerial UE 104'. For another example, the receiving component 710 may receive system information of one or more neighbor cells, the system information indicating at least one of an intra-frequency cell reselection priority and an inter-frequency cell reselection priority, the intra-frequency cell reselection priority and the inter-frequency cell reselection priority being configured to prioritize selection of aerial cells and/or aerial sectors by the aerial UE 104'.

The performing component 712 may perform a RACH procedure with the mobile network according to the system information. For example, the performing component 712 may calculate cell reselection criteria according to the first bias offsets and the second bias offsets, and determine whether to perform a cell reselection procedure according to the cell reselection criteria. For another example, the performing component 712 may determine whether to perform a cell reselection procedure based at least on the intra-frequency cell reselection priority and the inter-frequency cell reselection priority.

The establishing component 714 may establish, a communications link with the mobile network via the aerial cell and/or aerial sector 504.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1, and 3-5 (e.g., UE aerial cell component 198).

Figure 8:
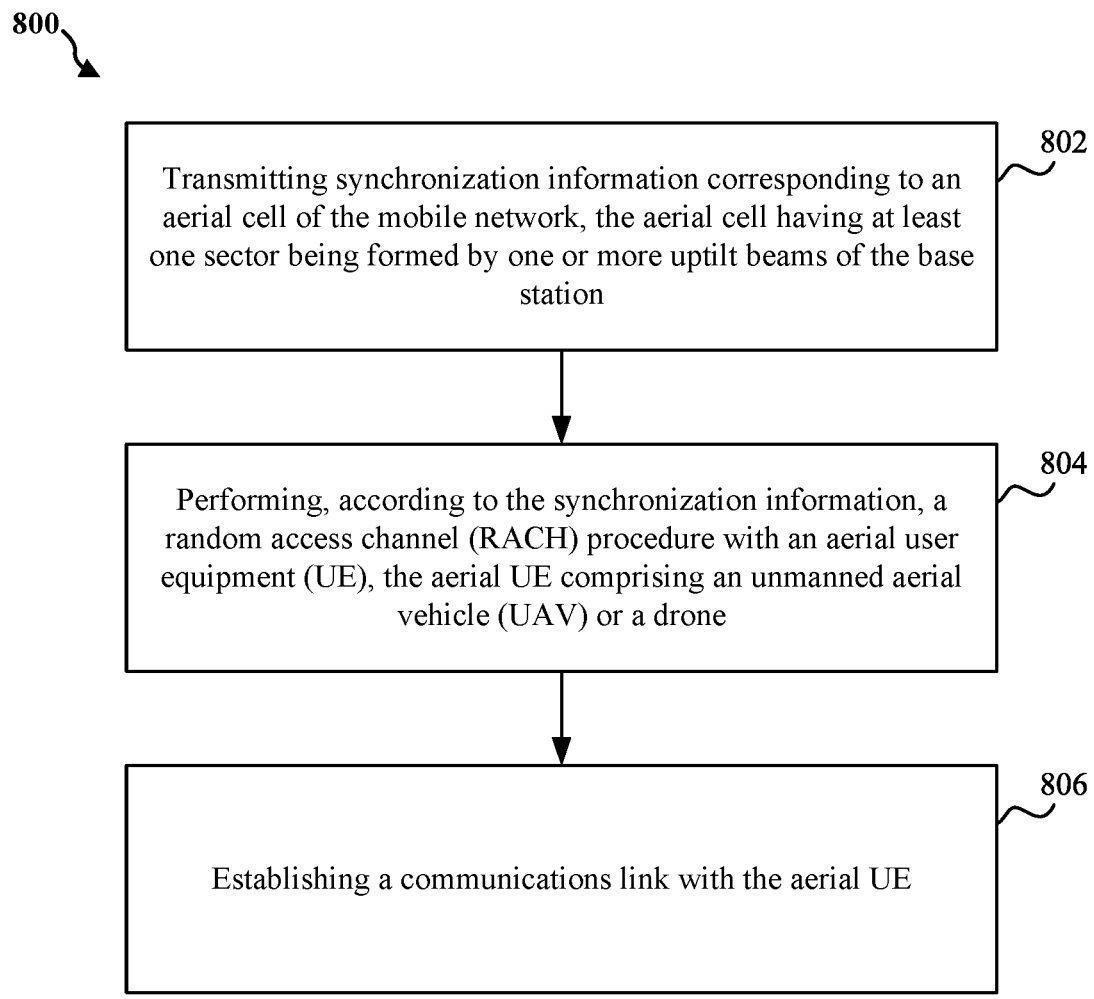
FIG. 8 is a flowchart of a method of wireless communication at a base station of a mobile network, in accordance with various aspects of the present disclosure.

Referring to FIG. 8, in operation, a base station 102 may perform a method 800 of wireless communication. The method 800 may be performed by the base station 102 (which may include the memory 376 and which may be the entire base station 102 and/or one or more components of the base station 102 such as the BS aerial cell component 188, the TX processor 316, the RX processor 370, and/or the controller/processor 375). The method 800 may be performed by the BS aerial cell component 188 in communication with the aerial UE 104'.

At block 802 of FIG. 8, the method 800 includes transmitting system information corresponding to an aerial cell of the mobile network or a cell having at least one aerial sector being formed by one or more uptilt beams of the component of the mobile network. For example, in an aspect, the base station 102, the BS aerial cell component 188, and/or the transmitting component 610 may be configured to or may comprise means for transmitting system information corresponding to an aerial cell 504 of the mobile network 100 or a cell having at least one aerial sector 504 being formed by one or more uptilt beams of the base station 102 of the mobile network.

For example, the transmitting at block 802 may include transmitting first configuration information of the serving cell 504 and second configuration information of one or more neighbor cells. Alternatively or additionally, the transmitting at block 802 may include transmitting third configuration information of an aerial sector in the serving cell 504 and fourth configuration information of one or more aerial sectors in the one or more neighbor cells. In some aspects, the transmitting at block 802 may include transmitting a synchronization signal comprising the system information, the system information indicating at least one of a transmit power level and a transmit power offset of the synchronization signal. The base station 102 may transmit the system information over the terrestrial cell 502 and/or the aerial cell 504. The terrestrial cell 502 may be formed by one or more downtilt beams of the base station 102 of the mobile network 100.

In some aspects, the system information may comprise one or more SIBs. A first portion of the plurality of SIBs may be aerial SIBs that are configured for the aerial cell and/or aerial sector 504, and a second portion of the plurality of SIBs may be terrestrial (e.g., legacy) SIBs that are configured for a terrestrial cell 502 of the mobile network 100. The aerial SIBs may differ from the legacy SIBs in that the aerial SIBs comprise additional parameters dedicated to the aerial cell and/or aerial sector 504 and/or the aerial UEs 104'. Alternatively or additionally, the system information may comprise one or more CSI-RS. In other aspects, the system information may comprise at least one cell bias parameter with which the wireless communication devices (e.g., terrestrial UEs 104, aerial UEs 104') may select a next serving cell as part of a cell selection and/or cell re-selection (e.g., handover) procedure. For example, the one or more SIBs may comprise at least one of a bias offset per serving cell, a bias offset for each neighboring cell in an intra-frequency cell list, and a bias offset for each neighboring cell in an inter-frequency cell list. The bias offsets may prioritize selection of aerial cells and/or aerial sectors over selection of terrestrial cells by aerial UEs 104'.

In other optional or additional aspects, the transmitting at block 802 may include transmitting, at a first power level, a first SSB of the plurality of SSBs, and transmitting, at a second power level, a second SSB of the plurality of SSBs. The first power level may be different than the second power level.

In other optional or additional aspects, the transmitting at block 802 may include transmitting, at a first power level, a SIB indicating a CSI-RS configuration for the aerial cell and/or aerial sector 504, and transmitting, at a second power level and according to the CSI-RS configuration, a CSI-RS. The first power level may be different than the second power level.

In other optional or additional aspects, the transmitting at block 802 may include transmitting a terrestrial SSB of the plurality of terrestrial SSBs, and transmitting a CSI-RS according to a CSI-RS configuration, the CSI-RS configuration being based at least on the terrestrial SSB.

In other optional or additional aspects, the transmitting at block 802 may include transmitting, via a first uptilt beam of the one or more uptilt beams, an aerial SSB of the first portion of the plurality of SSBs, and transmitting, via a second uptilt beam of the one or more uptilt beams and according to the CSI-RS configuration, a CSI-RS.

In other optional or additional aspects, the transmitting at block 802 may include transmitting first system information indicating first bias offsets of the serving cell and/or serving sector 504, and transmit second system information indicating second bias offsets of one or more neighbor cells. The first bias offsets and the second bias offsets may be configured to prioritize selection of aerial cells and/or aerial sectors by the aerial UE 104'.

In other optional or additional aspects, the transmitting at block 802 may include transmitting system information indicating at least one of an intra-frequency cell reselection priority and an inter-frequency cell reselection priority, the intra-frequency cell reselection priority and the inter-frequency cell reselection priority may be configured to prioritize selection of aerial cells and/or aerial sectors by the aerial UE 104'.

Further, for example, the transmitting at block 802 may be performed to allow other wireless communication devices (e.g., terrestrial UEs 104, aerial UEs 104') to synchronize with the wireless communication system.

At block 804 of FIG. 8, the method 800 includes performing, according to the system information, a RACH procedure with an aerial UE. For example, in an aspect, the base station 102, the BS aerial cell component 188, and/or the performing component 612 may be configured to or may comprise means for performing, according to the system information, a RACH procedure with an aerial UE 104'.

For example, the performing at block 804 may include causing the aerial UE 104' to calculate a path loss as part of the RACH procedure based at least on the transmit power level indicated by the system information.

In some aspects, the performing at block 804 may include performing a cell reselection procedure in response to a determination based at least on cell reselection criteria calculated using the first bias offsets and the second bias offsets.

In other optional or additional aspects, the performing at block 804 may include performing a cell reselection procedure in response to a determination based at least on the intra-frequency cell reselection priority and the inter-frequency cell reselection priority.

Further, for example, the performing at block 804 may be performed to initiate the establishment of a communications link between the base station 102 and the aerial UE 104'. Alternatively or additionally, the performing at block 804 may be performed to initiate a handover of the aerial UE 104' to a selected aerial cell 504.

At block 806 of FIG. 8, the method 800 includes establishing, via the aerial cell or the at least one aerial sector, a communications link with the aerial UE. For example, in an aspect, the base station 102, the BS aerial cell component 188, and/or the establishing component 614 may be configured to or may comprise means for establishing, via the aerial cell 504 or the at least one aerial sector 504, a communications link with the aerial UE 104'.

For example, the establishing at block 806 may include establishing a channel between the base station 102 and the aerial UE 104'. The channel may be based on the Uu interface. In some aspects, the establishing at block 806 may include exchanging command and control information between the base station 102 and the aerial UE 104'. The command and control information may include, but not be limited to, flight control commands, sensor control commands, as well as, position, trajectory data (e.g., height, velocity, heading, yaw angle), status information (e.g., power reserve level, motor rotation speed). Alternatively or additionally, the aerial UE 104' may transmit sensory data (e.g., audio, pictures, video frames) to the base station 102.

Further, for example, the establishing at block 806 may be performed to establish a communications link over the aerial cell and/or aerial sector 504. Advantageously, the aerial cell and/or aerial sector 504 may provide a communications link dedicated for aerial UEs 104'. As such, the aerial cell and/or aerial sector 504 may allow for reduced power consumption and increased efficiency of the wireless communication system when compared to a conventional wireless communication system.

Figure 9:
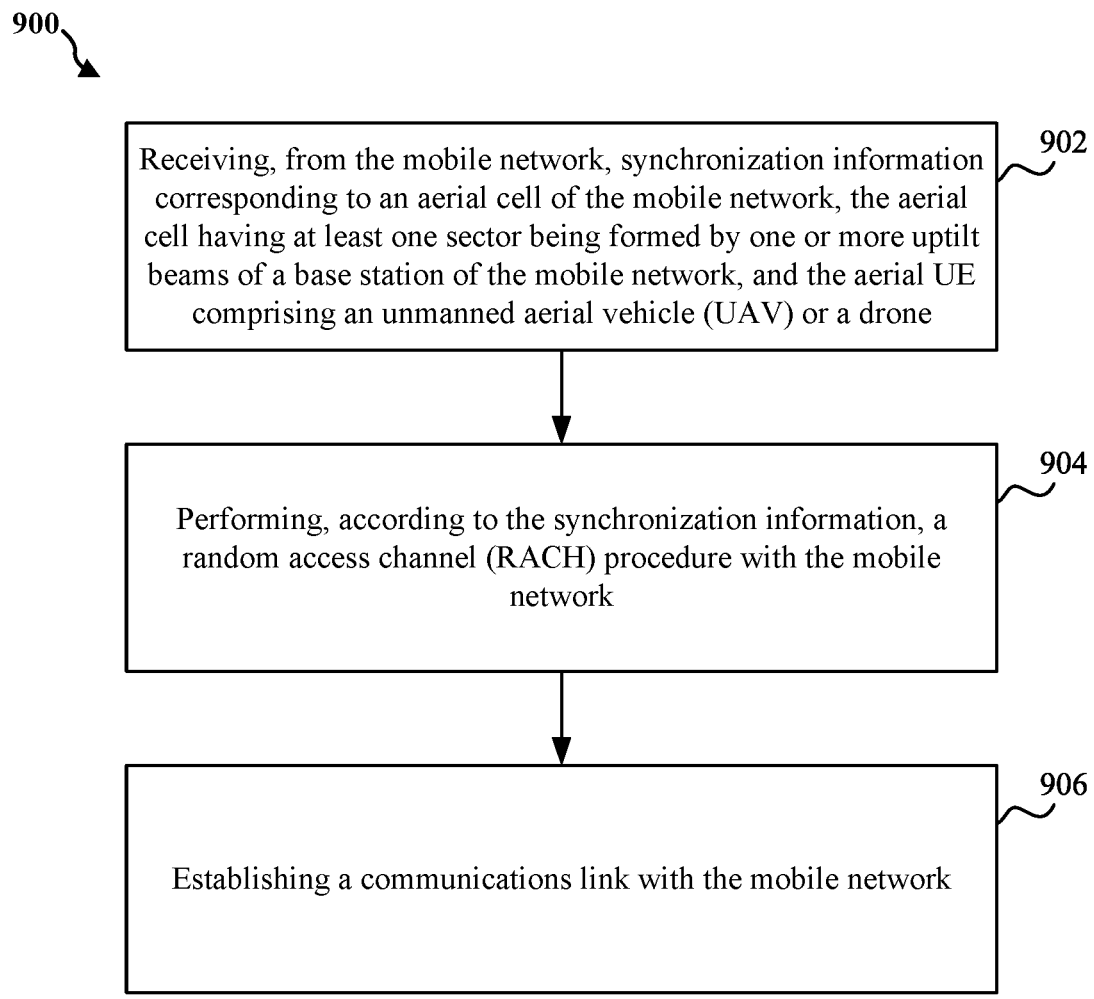
FIG. 9 is a flowchart of a method of wireless communication at an aerial UE, in accordance with various aspects of the present disclosure.

Referring to FIG. 9, in operation, an aerial UE 104' may perform a method 900 of wireless communication. The method 900 may be performed by the aerial UE 104' (which may include the memory 360 and which may be the entire aerial UE 104' and/or one or more components of the aerial UE 104' such as the UE aerial cell component 198, the TX processor 368, the RX processor 356, and/or the controller/processor 359). The method 900 may be performed by the UE aerial cell component 198 in communication with the base station 102.

At block 902 of FIG. 9, the method 900 includes receiving, from the mobile network, system information corresponding to an aerial cell of the mobile network or a cell having at least one aerial sector being formed by one or more uptilt beams of the base station. For example, in an aspect, the aerial UE 104', the UE aerial cell component 198, and/or the receiving component 710 may be configured to or may comprise means for receiving, from the mobile network 100, system information corresponding to an aerial cell 504 of the mobile network 100 or a cell having at least one aerial sector 504 being formed by one or more uptilt beams of the base station 102.

For example, the receiving at block 902 may include receiving, in response to determining that the height of the aerial UE exceeds the height threshold, the system information corresponding to the aerial cell and/or aerial sector 504 of the mobile network 100. That is, the aerial UE 104' may establish a communications link with the base station 102 over the aerial cell and/or aerial sector 504 if or when the aerial UE 104' exceeds the height threshold (e.g., flying above the ground at a height 510 exceeding the height threshold). Alternatively or additionally, the aerial UE 104' may establish a communications link with the base station 102 over the terrestrial cell 502 if or when the aerial UE 104' is below the height threshold (e.g., on the ground). In some aspects, the height threshold may be a predetermined value. Alternatively or additionally, the height threshold may be provided to the aerial UE 104' by the base station 102. For example, the aerial UE 104' may receive from the base station 102 a MIB and/or a SIB comprising the height threshold.

In some aspects, the receiving at block 902 may include receiving a first configuration information of the serving cell 504 and second configuration information of one or more neighbor cells 504. Alternatively or additionally, the receiving at block 902 may include receiving third configuration information of an aerial sector in the serving cell 504 and fourth configuration information of one or more aerial sectors of the one or more neighbor cells.

In other optional or additional aspects, the receiving at block 902 may include receiving a synchronization signal comprising the system information. The system information may indicate at least one of a transmit power level and a transmit power offset of the synchronization signal.

In other optional or additional aspects, the receiving at block 902 may include receiving a first SSB of the plurality of SSBs and receiving a second SSB of the plurality of SSBs. The first SSB may have been transmitted a first power level and the second SSB may have been transmitted a second power level. In some aspects, the first power level may be different than the second power level.

In other optional or additional aspects, the receiving at block 902 may include receiving a SIB indicating a CSI-RS configuration for the aerial cell and/or aerial sector 504, and receiving, according to the CSI-RS configuration, a CSI-RS. The SIB and the CSI-RS may have been transmitted at different power levels.

In other optional or additional aspects, the receiving at block 902 may include receiving a terrestrial SSB of the plurality of terrestrial SSBs, determining a CSI-RS configuration for the aerial cell based at least on the terrestrial SSB, and receiving, according to the CSI-RS configuration, a CSI-RS.

In other optional or additional aspects, the receiving at block 902 may include receiving an aerial SSB of the first portion of the plurality of SSBs. The aerial SSB may indicate a CSI-RS configuration for the aerial cell and/or aerial sector 504. The aerial SSB may have been transmitted via a first uptilt beam of the one or more uptilt beams. The receiving at block 902 may further include receiving, according to the CSI-RS configuration, a CSI-RS. The CSI-RS may have been transmitted via a second uptilt beam of the one or more uptilt beams. In some aspects, the first uptilt beam may be wider than to the second uptilt beam.

In other optional or additional aspects, the receiving at block 902 may include receiving first bias offsets of the serving cell and/or serving sector 504 and receiving second bias offsets of one or more neighbor cells. The first bias offsets and the second bias offsets may be configured to prioritize selection of aerial cells or aerial sectors by the aerial UE 104'.

In other optional or additional aspects, the receiving at block 902 may include receiving system information of one or more neighbor cells. The system information may indicate at least one of an intra-frequency cell reselection priority and an inter-frequency cell reselection priority. The intra-frequency cell reselection priority and the inter-frequency cell reselection priority may be configured to prioritize selection of aerial cells or aerial sectors by the aerial UE 104'.

Further, for example, the receiving at block 902 may be performed to establish a communications link with the base station 102 over the aerial cell and/or aerial sector 504 if or when the aerial UE 104' is above a height threshold (e.g., flying above the ground at a height 510 exceeding the height threshold). The receiving at block 902 may be further performed to obtain cell selection and/or cell re-selection information with which the aerial UE 104' may perform a handover procedure. The cell selection and/or cell re-selection information may be configured to prioritize aerial cells over terrestrial cells.

At block 904 of FIG. 9, the method 900 includes performing, according to the system information, a RACH procedure with the mobile network. For example, in an aspect, the aerial UE 104', the UE aerial cell component 198, and/or the performing component 712 may be configured to or may comprise means for performing, according to the system information, a RACH procedure with the mobile network 100.

For example, the performing at block 904 may include calculating cell reselection criteria according to the first bias offsets and the second bias offsets, and determining whether to perform a cell reselection procedure according to the cell reselection criteria.

In some aspects, the performing at block 904 may include determining whether to perform a cell reselection procedure based at least on the intra-frequency cell reselection priority and the inter-frequency cell reselection priority.

Further, for example, the performing at block 904 may be performed to initiate the establishment of a communications link between the base station 102 and the aerial UE 104'. Alternatively or additionally, the performing at block 904 may be performed to initiate a handover of the aerial UE 104' to a selected aerial cell and/or aerial sector 504.

At block 906 of FIG. 9, the method 900 includes establishing, via the aerial cell or the at least one aerial sector, a communications link with the mobile network. For example, in an aspect, the aerial UE 104', the UE aerial cell component 198, and/or the establishing component 714 may be configured to or may comprise means for establishing, via the aerial cell 504 or the at least one aerial sector 504, a communications link with the mobile network.

For example, the establishing at block 906 may include establishing a channel between the base station 102 and the aerial UE 104'. The channel may be based on the Uu interface. In some aspects, the establishing at block 906 may include exchanging command and control information between the base station 102 and the aerial UE 104'. The command and control information may include, but not be limited to, flight control commands, sensor control commands, as well as, position, trajectory data (e.g., height, velocity, heading, yaw angle), status information (e.g., power reserve level, motor rotation speed). Alternatively or additionally, the aerial UE 104' may transmit sensory data (e.g., audio, pictures, video frames) to the base station 102.

Further, for example, the establishing at block 906 may be performed to establish a communications link over the aerial cell and/or aerial sector 504. Advantageously, the aerial cell and/or aerial sector 504 may provide a communications link dedicated for aerial UEs 104'. As such, the aerial cell and/or aerial sector 504 may allow for reduced power consumption and increased efficiency of the wireless communication system when compared to a conventional wireless communication system.

Implementation examples are described in the following numbered clauses:

Clause 1: A method of wireless communication to be performed by a base station of a mobile network, comprising: transmitting system information corresponding to an aerial cell of the mobile network or a cell having at least one aerial sector being formed by one or more uptilt beams of the base station; performing, according to the system information, a random access channel (RACH) procedure with an aerial user equipment (UE); and establishing, via the aerial cell or the at least one aerial sector, a communications link with the aerial UE.

Clause 2: The method of clause 1, wherein the system information indicates a height threshold for the aerial UE; and wherein establishing, via the aerial cell or the at least one aerial sector, the communications link with the aerial UE comprises: establishing, via the aerial cell or the at least one aerial sector, the communications link with the aerial UE, based at least on a determination that a height of the aerial UE exceeds the height threshold.

Clause 3: The method of clauses 1 or 2, wherein a serving cell of the aerial UE is the aerial cell or the cell having the at least one aerial sector; and wherein transmitting the system information comprises: transmitting first configuration information of the serving cell and second configuration information of one or more neighbor cells; or transmitting third configuration information of an aerial sector in the serving cell and fourth configuration information of one or more aerial sectors of the one or more neighbor cells.

Clause 4: The method of any of the clauses 1-3, wherein transmitting the system information comprises: transmitting a synchronization signal comprising the system information, the system information indicating at least one of a transmit power level and a transmit power offset of the synchronization signal.

Clause 5: The method of any of the clauses 1-4, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein transmitting the system information comprises: transmitting, at a first power level, a first SSB of the plurality of SSBs; and transmitting, at a second power level, a second SSB of the plurality of SSBs, the first power level being different than the second power level.

Clause 6: The method of any of the clauses 1-5, wherein transmitting the system information comprises: transmitting, at a first power level, a system information block (SIB)

indicating a channel state information-reference signal (CSI-RS) configuration for the aerial cell or for the at least one aerial sector; and transmitting, at a second power level and according to the CSI-RS configuration, a CSI-RS, the first power level being different than the second power level.

Clause 7: The method of any of the clauses 1-6, wherein the system information comprises a plurality of terrestrial synchronization signal blocks (SSBs), the plurality of terrestrial SSBs being configured for a terrestrial cell of the mobile network, the terrestrial cell being formed by one or more downtilt beams of the base station; and wherein transmitting the system information comprises: transmitting a terrestrial SSB of the plurality of terrestrial SSBs; and transmitting a channel state information-reference signal (CSI-RS) according to a CSI-RS configuration, the CSI-RS configuration being based at least on the terrestrial SSB.

Clause 8: The method of any of the clauses 1-7, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein transmitting the system information comprises: transmitting, via a first uptilt beam of the one or more uptilt beams, an aerial SSB of the first portion of the plurality of SSBs, the aerial SSB indicating a channel state information-reference signal (CSI-RS) configuration for the aerial cell or for the at least one aerial sector; and transmitting, via a second uptilt beam of the one or more uptilt beams and according to the CSI-RS configuration, a CSI-RS, the first uptilt beam having a wider shape than the second uptilt beam.

Clause 9: The method of any of the clauses 1-8, wherein a serving cell of the aerial UE is the aerial cell or the cell having the at least one aerial sector; and wherein the method further comprises: transmitting first system information of the serving cell, the first system information indicating first bias offsets of the serving cell, the first bias offsets being configured to prioritize selection of aerial cells or aerial sectors by the aerial UE; transmitting second system information of one or more neighbor cells, the second system information indicating second bias offsets of the one or more neighbor cells, the second bias offsets being configured to prioritize selection of the aerial cells or aerial sectors by the aerial UE; and performing a cell reselection procedure in response to a determination based at least on cell reselection criteria calculated using the first bias offsets and the second bias offsets.

Clause 10: The method of any of the clauses 1-9, further comprising: transmitting another system information of one or more neighbor cells, the another system information indicating at least one of an intra-frequency cell reselection priority and an inter-frequency cell reselection priority, the intra-frequency cell reselection priority and the inter-frequency cell reselection priority being configured to prioritize selection of aerial cells or aerial sectors by the aerial UE; and performing a cell reselection procedure in response to a determination based at least on the intra-frequency cell reselection priority and the inter-frequency cell reselection priority.

Clause 11: An apparatus of wireless communication at a base station of a mobile network, comprising: a non-transitory memory storing computer-executable instructions; and a processor communicatively coupled with the non-transitory memory and configured to execute the computer-executable instructions to: transmit system information corresponding to an aerial cell of the mobile network or a cell having at least one aerial sector being formed by one or more uptilt beams of the base station; perform, according to the system information, a random access channel (RACH) procedure with an aerial user equipment (UE); and establish, via the aerial cell or the at least one aerial sector, a communications link with the aerial UE.

Clause 12: The apparatus of clause 11, wherein the system information indicates a height threshold for the aerial UE; and wherein to establish, via the aerial cell or the at least one aerial sector, the communications link with the aerial UE comprises further computer-executable instructions to: establish, via the aerial cell or the at least one aerial sector, the communications link with the aerial UE, based at least on a determination that a height of the aerial UE exceeds the height threshold.

Clause 13: The apparatus of clauses 11 or 12, wherein a serving cell of the aerial UE is the aerial cell or the cell having the at least one aerial sector; and wherein to transmit the system information comprises further computer-executable instructions to: transmit first configuration information of the serving cell and second configuration information of one or more neighbor cells; or transmit third configuration information of an aerial sector in the serving cell and fourth configuration information of one or more aerial sectors of the one or more neighbor cells.

Clause 14: The apparatus of any of the clauses 11-13, wherein to transmit the system information comprises further computer-executable instructions to: transmit a synchronization signal comprising the system information, the system information indicating at least one of a transmit power level and a transmit power offset of the synchronization signal.

Clause 15: The apparatus of any of the clauses 10-14, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein to transmit the system information comprises further computer-executable instructions to: transmit, at a first power level, a first SSB of the plurality of SSBs; and transmit, at a second power level, a second SSB of the plurality of SSBs, the first power level being different than the second power level.

Clause 16: The apparatus of any of the clauses 10-15, wherein to transmit the system information comprises further computer-executable instructions to: transmit, at a first power level, a system information block (SIB) indicating a channel state information-reference signal (CSI-RS) configuration for the aerial cell or for the at least one aerial sector; and transmit, at a second power level and according to the CSI-RS configuration, a CSI-RS, the first power level being different than the second power level.

Clause 17: The apparatus of any of the clauses 10-16, wherein the system information comprises a plurality of terrestrial synchronization signal blocks (SSBs), the plurality of terrestrial SSBs being configured for a terrestrial cell of the mobile network, the terrestrial cell being formed by one or more downtilt beams of the base station; and wherein to transmit the system information comprises further computer-executable instructions to: transmit a terrestrial SSB of the plurality of terrestrial SSBs; and transmit a channel state information-reference signal (CSI-RS) according to a CSI-RS configuration, the CSI-RS configuration being based at least on the terrestrial SSB.

Clause 18: The apparatus of any of the clauses 10-17, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein to transmit the system information comprises further computer-executable instructions to: transmit, via a first uptilt beam of the one or more uptilt beams, an aerial SSB of the first portion of the plurality of SSBs, the aerial SSB indicating a channel state information-reference signal (CSI-RS) configuration for the aerial cell or for the at least one aerial sector; and transmit, via a second uptilt beam of the one or more uptilt beams and according to the CSI-RS configuration, a CSI-RS, the first uptilt beam having a wider shape than the second uptilt beam.

Clause 19: The apparatus of any of the clauses 10-18, wherein a serving cell of the aerial UE is the aerial cell or the cell having the at least one aerial sector; and wherein the processor is configured to execute further computer-executable instructions to: transmit first system information of the serving cell, the first system information indicating first bias offsets of the serving cell, the first bias offsets being configured to prioritize selection of aerial cells or aerial sectors by the aerial UE; transmit second system information of one or more neighbor cells, the second system information indicating second bias offsets of the one or more neighbor cells, the second bias offsets being configured to prioritize selection of the aerial cells or aerial sectors by the aerial UE; and performing a cell reselection procedure in response to a determination based at least on cell reselection criteria calculated using the first bias offsets and the second bias offsets.

Clause 20: The apparatus of any of the clauses 10-19, wherein the processor is configured to execute further computer-executable instructions to: transmit another system information of one or more neighbor cells, the another system information indicating at least one of an intra-frequency cell reselection priority and an inter-frequency cell reselection priority, the intra-frequency cell reselection priority and the inter-frequency cell reselection priority being configured to prioritize selection of aerial cells or aerial sectors by the aerial UE; and perform a cell reselection procedure in response to a determination based at least on the intra-frequency cell reselection priority and the inter-frequency cell reselection priority.

Clause 21: A method of wireless communication to be performed by an aerial user equipment (UE) in a mobile network, comprising: receiving, from the mobile network, system information corresponding to an aerial cell of the mobile network or a cell having at least one aerial sector being formed by one or more uptilt beams of a base station of the mobile network; performing, according to the system information, a random access channel (RACH) procedure with the mobile network; and establishing, via the aerial cell or the at least one aerial sector, a communications link with the mobile network.

Clause 22: The method of clause 21, wherein receiving the system information comprises: determining that a height of the aerial UE exceeds a height threshold; and receiving, in response to determining that the height of the aerial UE exceeds the height threshold, the system information corresponding to the aerial cell of the mobile network or the cell having the at least one aerial sector.

Clause 23: The method of clauses 21 or 22, wherein a serving aerial cell of the aerial UE is the aerial cell or the cell having the at least one aerial sector; and wherein receiving the system information comprises: receiving first configuration information of the serving cell and second configuration information of one or more neighbor cells; or receiving third configuration information of an aerial sector in the serving cell and fourth configuration information of one or more aerial sectors of the one or more neighbor cells.

Clause 24: The method of any of the clauses 21-23, wherein receiving the system information comprises: receiving a synchronization signal comprising the system information, the system information indicating at least one of a transmit power level and a transmit power offset of the synchronization signal.

Clause 25: The method of any of the clauses 21-24, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein receiving the system information comprises: receiving a first SSB of the plurality of SSBs, the first SSB having been transmitted a first power level; and receiving a second SSB of the plurality of SSBs, the second SSB having been transmitted a second power level, the first power level being different than the second power level.

Clause 26: The method of any of the clauses 21-25, wherein receiving the system information comprises: receiving a system information block (SIB) indicating a channel state information-reference signal (CSI-RS) configuration for the aerial cell or for the at least one aerial sector, the SIB having been transmitted at a first power level; and receiving, according to the CSI-RS configuration, a CSI-RS, the CSI-RS having been transmitted a second power level, the first power level being different than the second power level.

Clause 27: The method of any of the clauses 21-26, wherein the system information comprises a plurality of terrestrial synchronization signal blocks (SSBs), the plurality of terrestrial SSBs being configured for a terrestrial cell of the mobile network, the terrestrial cell being formed by one or more downtilt beams of the base station; and wherein receiving the system information comprises: receiving a terrestrial SSB of the plurality of terrestrial SSBs; determining a channel state information-reference signal (CSI-RS) configuration for the aerial cell based at least on the terrestrial SSB; and receiving, according to the CSI-RS configuration, a CSI-RS.

Clause 28: The method of any of the clauses 21-27, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein receiving the system information comprises: receiving an aerial SSB of the first portion of the plurality of SSBs, the aerial SSB indicating a channel state information-reference signal (CSI-RS) configuration for the aerial cell or for the at least one aerial sector, the aerial SSB having been transmitted via a first uptilt beam of the one or more uptilt beams; and receiving, according to the CSI-RS configuration, a CSI-RS, the CSI-RS having been transmitted via a second uptilt beam of the one or more uptilt beams, the first uptilt beam having a wider shape than the second uptilt beam.

Clause 29: The method of any of the clauses 21-28, wherein a serving cell of the aerial UE is the aerial cell or the cell having the at least one aerial sector; and wherein the method further comprises: receiving first system information of the serving cell, the first system information indicating first bias offsets of the serving cell, the first bias offsets being configured to prioritize selection of aerial cells or aerial sectors by the aerial UE; receiving second system information of one or more neighbor cells, the second system information indicating second bias offsets of the one or more neighbor cells, the second bias offsets being configured to prioritize selection of the aerial cells or the aerial sectors by the aerial UE; calculating, according to the first bias offsets and the second bias offsets, cell reselection criteria; and determining whether to perform a cell reselection procedure according to the cell reselection criteria.

Clause 30: The method of any of the clauses 21-29, further comprising: receiving another system information of one or more neighbor cells, the another system information indicating at least one of an intra-frequency cell reselection priority and an inter-frequency cell reselection priority, the intra-frequency cell reselection priority and the inter-frequency cell reselection priority being configured to prioritize selection of aerial cells or aerial sectors by the aerial UE; and determining whether to perform a cell reselection procedure based at least on the intra-frequency cell reselection priority and the inter-frequency cell reselection priority.

Clause 31: An apparatus of wireless communication at an aerial user equipment (UE) in a mobile network, comprising: a non-transitory memory storing computer-executable instructions; and a processor communicatively coupled with the non-transitory memory and configured to execute the computer-executable instructions to: receive, from the mobile network, system information corresponding to an aerial cell of the mobile network or a cell having at least one aerial sector being formed by one or more uptilt beams of a base station of the mobile network; perform, according to the system information, a random access channel (RACH) procedure with the mobile network; and establish, via the aerial cell or the at least one aerial sector, a communications link with the mobile network.

Clause 32: The apparatus of clause 31, wherein to receive the system information comprises further computer-executable instructions to: determine that a height of the aerial UE exceeds a height threshold; and receive, in response to determining that the height of the aerial UE exceeds the height threshold, the system information corresponding to the aerial cell of the mobile network or the cell having the at least one aerial sector.

Clause 33: The apparatus of clauses 31 or 32, wherein a serving cell of the aerial UE is the aerial cell or the cell having the at least one aerial sector; and wherein to receive the system information comprises further computer-executable instructions to: receive first configuration information of the serving cell and second configuration information of one or more neighbor cells; or receiving third configuration information of an aerial sector in the serving cell and fourth configuration information of one or more aerial sectors of the one or more neighbor cells.

Clause 34: The apparatus of any of the clauses 31-33, wherein to receive the system information comprises further computer-executable instructions to: receive a synchronization signal comprising the system information, the system information indicating at least one of a transmit power level and a transmit power offset of the synchronization signal.

Clause 35: The apparatus of any of the clauses 31-34, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein to receive the system information comprises further computer-executable instructions to: receive a first SSB of the plurality of SSBs, the first SSB having been transmitted a first power level; and receive a second SSB of the plurality of SSBs, the second SSB having been transmitted a second power level, the first power level being different than the second power level.

Clause 36: The apparatus of any of the clauses 31-35, wherein to receive the system information comprises further computer-executable instructions to: receive a system information block (SIB) indicating a channel state information-reference signal (CSI-RS) configuration for the aerial cell or for the at least one aerial sector, the SIB having been transmitted at a first power level; and receive, according to the CSI-RS configuration, a CSI-RS, the CSI-RS having been transmitted a second power level, the first power level being different than the second power level.

Clause 37: The apparatus of any of the clauses 31-36, wherein the system information comprises a plurality of terrestrial synchronization signal blocks (SSBs), the plurality of terrestrial SSBs being configured for a terrestrial cell of the mobile network, the terrestrial cell being formed by one or more downtilt beams of the base station; and wherein to receive the system information comprises further computer-executable instructions to: receive a terrestrial SSB of the plurality of terrestrial SSBs; determine a channel state information-reference signal (CSI-RS) configuration for the aerial cell based at least on the terrestrial SSB; and receive, according to the CSI-RS configuration, a CSI-RS.

Clause 38: The apparatus of any of the clauses 31-37, wherein the system information comprises a plurality of synchronization signal blocks (SSBs), a first portion of the plurality of SSBs being configured for the aerial cell or for the at least one aerial sector, and a second portion of the plurality of SSBs being configured for a terrestrial cell of the mobile network, the terrestrial cell being formed by one or more downtilt beams of the base station; and wherein to receive the system information comprises further computer-executable instructions to: receive an aerial SSB of the first portion of the plurality of SSBs, the aerial SSB indicating a channel state information-reference signal (CSI-RS) configuration for the aerial cell or for the at least one aerial sector, the aerial SSB having been transmitted via a first uptilt beam of the one or more uptilt beams; and receive, according to the CSI-RS configuration, a CSI-RS, the CSI-RS having been transmitted via a second uptilt beam of the one or more uptilt beams, the first uptilt beam having wider shape than the second uptilt beam.

Clause 39: The apparatus of any of the clauses 31-38, wherein a serving aerial cell of the aerial UE is the aerial cell or the cell having the at least one aerial sector; and wherein the processor is configured to execute further computer-executable instructions to: receive first system information of the serving cell, the first system information indicating first bias offsets of the serving cell, the first bias offsets being configured to prioritize selection of aerial cells or aerial sectors by the aerial UE; receive second system information of one or more neighbor cells, the second system information indicating second bias offsets of the one or more neighbor cells, the second bias offsets being configured to prioritize selection of the aerial cells or the aerial sectors by the aerial UE; calculate, according to the first bias offsets and the second bias offsets, cell reselection criteria; and determine whether to perform a cell reselection procedure according to the cell reselection criteria.

Clause 40: The apparatus of any of the clauses 21-39, wherein the processor is configured to execute further computer-executable instructions to:receive another system information of one or more neighbor cells, the another system information indicating at least one of an intra-frequency cell reselection priority and an inter-frequency cell reselection priority, the intra-frequency cell reselection priority and the inter-frequency cell reselection priority being configured to prioritize selection of aerial cells or aerial sectors by the aerial UE; and determine whether to perform a cell reselection procedure based at least on the intra-frequency cell reselection priority and the inter-frequency cell reselection priority.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a base station of a mobile network, comprising:
   transmitting first system information corresponding to an aerial cell of the mobile network or a cell having at least one aerial sector, the aerial cell or the at least one aerial sector being formed by a first set of beams of the base station;
   transmitting second system information corresponding to a terrestrial cell of the mobile network, the terrestrial cell being formed by a second set of beams of the base station, the second system information being separate from the first system information, wherein transmitting the second system information comprises transmitting a plurality of terrestrial synchronization signal blocks (SSBs), the plurality of terrestrial SSBs being configured for the terrestrial cell of the mobile network, wherein transmitting the second system information comprises:
      transmitting a terrestrial SSB of the plurality of terrestrial SSBs; and
      transmitting a channel state information-reference signal (CSI-RS) according to a CSI-RS configuration, the CSI-RS configuration being based at least on the terrestrial SSB;
   performing, according to the first system information, a random access channel (RACH) procedure with an aerial user equipment (UE); and
   establishing, via the aerial cell or the at least one aerial sector, a communications link with the aerial UE.

2. The method of claim 1,
   wherein the first system information indicates a height threshold for the aerial UE; and
   wherein establishing, via the aerial cell or the at least one aerial sector, the communications link with the aerial UE comprises:
      establishing, via the aerial cell or the at least one aerial sector, the communications link with the aerial UE, based at least on a determination that a height of the aerial UE exceeds the height threshold.

3. The method of claim 1,
   wherein a serving cell of the aerial UE is the aerial cell or the cell having the at least one aerial sector; and
   wherein transmitting the first system information comprises:

transmitting first configuration information of the serving cell and second configuration information of one or more neighbor cells; or transmitting third configuration information of an aerial sector in the serving cell and fourth configuration information of one or more aerial sectors of the one or more neighbor cells.

4. The method of claim 1, wherein transmitting the first system information comprises:

transmitting a synchronization signal comprising the first system information, the first system information indicating at least one of a transmit power level and a transmit power offset of the synchronization signal.

5. A method of wireless communication performed by a base station of a mobile network, comprising:

transmitting system information corresponding to an aerial cell of the mobile network or a cell having at least one aerial sector, the aerial cell or the at least one aerial sector being formed by a first set of beams of the base station, wherein the system information comprises a first portion of a plurality of synchronization signal blocks (SSBs), the first portion of the plurality of SSBs being configured for the aerial cell or for the at least one aerial sector, wherein transmitting the system information comprises:

transmitting, at a first power level, a first SSB of the plurality of SSBs; and transmitting, at a second power level, a second SSB of the plurality of SSBs, the first power level being different than the second power level;

performing, according to the system information, a random access channel (RACH) procedure with an aerial user equipment (UE); and establishing, via the aerial cell or the at least one aerial sector, a communications link with the aerial UE.

6. The method of claim 1, wherein transmitting the first system information comprises:

transmitting, at a first power level, a system information block (SIB) indicating a channel state information-reference signal (CSI-RS) configuration for the aerial cell or for the at least one aerial sector; and transmitting, at a second power level and according to the CSI-RS configuration, a CSI-RS, the first power level being different than the second power level.

7. A method of wireless communication performed by a base station of a mobile network, comprising:

transmitting system information corresponding to an aerial cell of the mobile network or a cell having at least one aerial sector, the aerial cell or the at least one aerial sector being formed by a first set of beams of the base station, wherein the system information comprises a first portion of a plurality of synchronization signal blocks (SSBs), the first portion of the plurality of SSBs being configured for the aerial cell or for the at least one aerial sector, wherein transmitting the system information comprises:

transmitting, via a first beam of the first set of beams, an aerial SSB of the first portion of the plurality of SSBs, the aerial SSB indicating a channel state information-reference signal (CSI-RS) configuration for the aerial cell or for the at least one aerial sector; and transmitting, via a second beam of the first set of beams and according to the CSI-RS configuration, a CSI-RS, the first beam having a wider shape than the second beam;

performing, according to the system information, a random access channel (RACH) procedure with an aerial user equipment (UE); and establishing, via the aerial cell or the at least one aerial sector, a communications link with the aerial UE.

8. A method of wireless communication performed by a base station of a mobile network, comprising:

transmitting system information corresponding to an aerial cell of the mobile network or a cell having at least one aerial sector, the aerial cell or the at least one aerial sector being formed by a first set of beams of the base station, wherein a serving cell of the aerial UE is the aerial cell or the cell having the at least one aerial sector;

transmitting serving cell system information of the serving cell, the serving cell system information indicating first bias offsets of the serving cell, the first bias offsets being configured to prioritize selection of aerial cells or aerial sectors by the aerial UE;

transmitting neighbor cell system information of one or more neighbor cells, the neighbor cell system information indicating second bias offsets of the one or more neighbor cells, the second bias offsets being configured to prioritize selection of the aerial cells or the aerial sectors by the aerial UE;

performing, according to the system information, a random access channel (RACH) procedure with an aerial user equipment (UE);

establishing, via the aerial cell or the at least one aerial sector, a communications link with the aerial UE; and performing a cell reselection procedure in response to a determination based at least on cell reselection criteria calculated using the first bias offsets and the second bias offsets.

9. A method of wireless communication performed by a base station of a mobile network, comprising:

transmitting system information corresponding to an aerial cell of the mobile network or a cell having at least one aerial sector, the aerial cell or the at least one aerial sector being formed by a first set of beams of the base station;

transmitting second system information of one or more neighbor cells, the second system information indicating at least one of an intra-frequency cell reselection priority or an inter-frequency cell reselection priority, the at least one of the intra-frequency cell reselection priority or the inter-frequency cell reselection priority being configured to prioritize selection of aerial cells or aerial sectors by the aerial UE;

performing, according to the system information, a random access channel (RACH) procedure with an aerial user equipment (UE);

establishing, via the aerial cell or the at least one aerial sector, a communications link with the aerial UE; and performing a cell reselection procedure in response to a determination based on the at least one of the intra-frequency cell reselection priority or the inter-frequency cell reselection priority.

10. An apparatus for wireless communication, comprising:

a processing system configured to:

transmit first system information corresponding to an aerial cell of a mobile network or a cell having at least one aerial sector, the aerial cell or the at least one aerial sector being formed by a first set of beams of the apparatus;

transmit second system information corresponding to a terrestrial cell of the mobile network, the terrestrial cell being formed by a second set of beams of the apparatus, the second system information being separate from the first system information, wherein the second system information includes a plurality of terrestrial synchronization signal blocks (SSBs), the plurality of terrestrial SSBs being configured for the terrestrial cell of the mobile network, wherein to transmit the second system information, the processing system is configured to:
transmit a terrestrial SSB of the plurality of terrestrial SSBs; and
transmit a channel state information-reference signal (CSI-RS) according to a CSI-RS configuration, the CSI-RS configuration being based at least on the terrestrial SSB;
perform, according to the first system information, a random access channel (RACH) procedure with an aerial user equipment (UE); and
establish, via the aerial cell or the at least one aerial sector, a communications link with the aerial UE.

11. The apparatus of claim 10,
wherein the first system information indicates a height threshold for the aerial UE; and
wherein to establish, via the aerial cell or the at least one aerial sector, the communications link with the aerial UE, the processing system is configured to:
establish, via the aerial cell or the at least one aerial sector, the communications link with the aerial UE, based at least on a determination that a height of the aerial UE exceeds the height threshold.

12. The apparatus of claim 10, wherein to transmit the first system information, the processing system is configured to:
transmit, at a first power level, a system information block (SIB) indicating a channel state information-reference signal (CSI-RS) configuration for the aerial cell or for the at least one aerial sector; and
transmit, at a second power level and according to the CSI-RS configuration, a CSI-RS, the first power level being different than the second power level.

13. The apparatus of claim 10,
wherein a serving cell of the aerial UE is the aerial cell or the cell having the at least one aerial sector; and
wherein to transmit the first system information, the processing system is configured to:
transmit serving cell system information of the serving cell, the serving cell system information indicating first bias offsets of the serving cell, the first bias offsets being configured to prioritize selection of aerial cells or aerial sectors by the aerial UE;
transmit neighbor cell system information of one or more neighbor cells, the neighbor cell system information indicating second bias offsets of the one or more neighbor cells, the second bias offsets being configured to prioritize selection of the aerial cells or the aerial sectors by the aerial UE; and
perform a cell reselection procedure in response to a determination based at least on cell reselection criteria calculated using the first bias offsets and the second bias offsets.

14. The apparatus of claim 10, wherein the processing system is configured to:
transmit third system information of one or more neighbor cells, the third system information indicating at least one of an intra-frequency cell reselection priority or an interfrequency cell reselection priority, the at least one of the intra-frequency cell reselection priority or the interfrequency cell reselection priority being configured to prioritize selection of aerial cells or aerial sectors by the aerial UE; and
perform a cell reselection procedure in response to a determination based on the at least one of the intra-frequency cell reselection priority or the inter-frequency cell reselection priority.

15. A method of wireless communication performed by an aerial user equipment (UE) in a mobile network, comprising:
receiving, from the mobile network, first system information corresponding to an aerial cell of the mobile network or a cell having at least one aerial sector, the aerial cell or the at least one aerial sector being formed by a first set of beams of a base station of the mobile network, the first system information being separate from second system information corresponding to a terrestrial cell of the mobile network, the terrestrial cell being formed by a second set of beams of the base station, wherein the first system information comprises a first portion of a plurality of synchronization signal blocks (SSBs), the first portion of the plurality of SSBs being configured for the aerial cell or for the at least one aerial sector, and the second system information comprises a second portion of the plurality of SSBs, and wherein receiving the first system information comprises:
receiving a first SSB of the plurality of SSBs, the first SSB having been transmitted a first power level;
performing, according to the first system information, a random access channel (RACH) procedure with the mobile network; and
establishing, via the aerial cell or the at least one aerial sector, a communications link with the mobile network.

16. The method of claim 15, wherein establishing the communications link comprises:
determining that the first system information indicates a height threshold for the aerial UE;
determining that a height of the aerial UE exceeds the height threshold; and
in response to determining that the height of the aerial UE exceeds the height threshold, establishing the communications link with the mobile network via the aerial cell or the at least one aerial sector.

17. The method of claim 15, wherein a serving cell is the aerial cell or the cell having the at least one aerial sector, the method further comprising:
receiving serving cell configuration information of the serving cell and neighbor cell configuration information of one or more neighbor cells; or
receiving third configuration information of an aerial sector in the serving cell and fourth configuration information of one or more aerial sectors of the one or more neighbor cells.

18. The method of claim 15, wherein receiving the first system information comprises:
receiving a synchronization signal comprising the first system information, the first system information indicating at least one of a transmit power level and a transmit power offset of the synchronization signal.

19. The method of claim 15, wherein receiving the first system information comprises:
receiving a system information block (SIB) indicating a channel state information-reference signal (CSI-RS)

configuration for the aerial cell or for the at least one aerial sector, the SIB having been transmitted at a first power level; and receiving, according to the CSI-RS configuration, a CSI-RS, the CSI-RS having been transmitted a second power level, the first power level being different than the second power level.

20. The method of claim 15, further comprising:
receiving the second system information, the second system information comprising a plurality of terrestrial synchronization signal blocks (SSBs), the plurality of terrestrial SSBs being configured for the terrestrial cell of the mobile network;
receiving a terrestrial SSB of a second plurality of terrestrial SSBs;
determining a channel state information-reference signal (CSI-RS) configuration for the aerial cell based at least on the terrestrial SSB; and
receiving, according to the CSI-RS configuration, a CSI-RS.

21. The method of claim 15,
wherein the first system information comprises a first portion of a plurality of synchronization signal blocks (SSBs), the first portion of the plurality of SSBs being configured for the aerial cell or for the at least one aerial sector, and the second system information comprises a second portion of the plurality of SSBs being configured for the terrestrial cell of the mobile network; and
wherein receiving the first system information comprises:
receiving an aerial SSB of the first portion of the plurality of SSBs, the aerial SSB indicating a channel state information-reference signal (CSI-RS) configuration for the aerial cell or for the at least one aerial sector, the aerial SSB having been transmitted via a first beam of the first set of beams; and
receiving, according to the CSI-RS configuration, a CSI-RS, the CSI-RS having been transmitted via a second beam of the first set of beams, the first beam having a wider shape than the second beam.

22. The method of claim 15,
wherein a serving cell of the aerial UE is the aerial cell or the cell having the at least one aerial sector; and
wherein the method further comprises:
receiving serving cell system information of the serving cell, the serving cell system information indicating first bias offsets of the serving aerial cell, the first bias offsets being configured to prioritize selection of aerial cells or aerial sectors by the aerial UE;
receiving neighbor cell system information of one or more neighbor cells, the neighbor cell system information indicating second bias offsets of the one or more neighbor cells, the second bias offsets being configured to prioritize selection of the aerial cells or the aerial sectors by the aerial UE;
calculating, according to the first bias offsets and the second bias offsets, cell reselection criteria; and
determining whether to perform a cell reselection procedure according to the cell reselection criteria.

23. The method of claim 15, further comprising:
receiving third system information of one or more neighbor cells, the third system information indicating at least one of an intra-frequency cell reselection priority or an interfrequency cell reselection priority, the at least one of the intra-frequency cell reselection priority or the interfrequency cell reselection priority being configured to prioritize selection of aerial cells or aerial sectors by the aerial UE; and determining whether to perform a cell reselection procedure based on the at least one of the intra-frequency cell reselection priority or the inter-frequency cell reselection priority.

24. An aerial user equipment (UE) for wireless communication, comprising:
a processing system configured to:
receive, from a mobile network, first system information corresponding to an aerial cell of the mobile network or a cell having at least one aerial sector, the aerial cell or the at least one aerial sector being formed by a first set of beams of a base station of the mobile network, the first system information being separate from second system information corresponding to a terrestrial cell of the mobile network, the terrestrial cell being formed by a second set of beams of the base station, wherein the first system information comprises a first portion of a plurality of synchronization signal blocks (SSBs), the first portion of the plurality of SSBs being configured for the aerial cell or for the at least one aerial sector, and the second system information comprises a second portion of the plurality of SSBs, and wherein to receive the first system information, the processing system is configured to:
receive a first SSB of the plurality of SSBs, the first SSB having been transmitted a first power level; and
perform, according to the first system information, a random access channel (RACH) procedure with the mobile network; and
establish, via the aerial cell or the at least one aerial sector, a communications link with the mobile network.

25. The aerial UE of claim 24, wherein to establish the communications link, the processing system is configured to:
determine that the first system information indicates a height threshold for the aerial UE;
determine that a height of the aerial UE exceeds the height threshold; and
in response to determining that the height of the aerial UE exceeds the height threshold, establish the communications link with the mobile network via the aerial cell or the at least one aerial sector.

26. The aerial UE of claim 24, wherein to receive the first system information, the processing system is configured to:
receive a system information block (SIB) indicating a channel state information-reference signal (CSI-RS) configuration for the aerial cell or for the at least one aerial sector, the SIB having been transmitted at a first power level; and
receive, according to the CSI-RS configuration, a CSI-RS, the CSI-RS having been transmitted a second power level, the first power level being different than the second power level.

27. The aerial UE of claim 24,
wherein a serving cell of the aerial UE is the aerial cell or the cell having the at least one aerial sector; and
wherein the processing system is configured to:
receive serving cell system information of the serving cell, the serving cell system information indicating first bias offsets of the serving cell, the first bias offsets being configured to prioritize selection of aerial cells or aerial sectors by the aerial UE;
receive neighbor cell system information of one or more neighbor cells, the neighbor cell system information indicating second bias offsets of the one or more neighbor cells, the second bias offsets being configured to prioritize selection of the aerial cells or the aerial sectors by the aerial UE;

calculate, according to the first bias offsets and the second bias offsets, cell reselection criteria; and determine whether to perform a cell reselection procedure according to the cell reselection criteria.

28. The aerial UE of claim 24, wherein the processing system is configured to:

receive third system information of one or more neighbor cells, the third system information indicating at least one of an intra-frequency cell reselection priority or an interfrequency cell reselection priority, the at least one of the intra-frequency cell reselection priority or the interfrequency cell reselection priority being configured to prioritize selection of aerial cells or aerial sectors by the aerial UE; and determine whether to perform a cell reselection procedure based on the at least one of the intra-frequency cell reselection priority or the inter-frequency cell reselection priority.

* * * * *